United States Patent [19]

Yoshinaga et al.

[11] Patent Number: 4,995,705
[45] Date of Patent: Feb. 26, 1991

[54] DEVICE, METHOD AND APPARATUS FOR OPTICAL MODULATION USING FERROELECTRIC POLYMER LIQUID CRYSTALS

[75] Inventors: Kazuo Yoshinaga, Machida; Takeshi Miyazaki, Kawasaki; Toshikazu Ohnishi, Tokyo; Yutaka Kurabayashi, Yokohama; Yoshio Takasu, Tama; Tadashi Kobayashi, Yokohama, all of Japan

[73] Assignee: Canon Kabushiki Kaisha, Tokyo, Japan

[21] Appl. No.: 133,797

[22] Filed: Dec. 16, 1987

[30] Foreign Application Priority Data

Dec. 17, 1986 [JP] Japan ............................... 61-300876
Dec. 26, 1986 [JP] Japan ............................... 61-310826
Dec. 26, 1986 [JP] Japan ............................... 61-310827
Jul. 7, 1987 [JP] Japan ............................... 62-169435

[51] Int. Cl.⁵ ............................................. G02F 1/13
[52] U.S. Cl. ................................ 350/350 S; 350/347 E; 350/351; 365/65; 365/145
[58] Field of Search .......... 350/347 V, 347 E, 350 S, 350/351; 365/65, 145

[56] References Cited

U.S. PATENT DOCUMENTS

| | | | |
|---|---|---|---|
| 3,851,318 | 11/1974 | Taylor et al. | 350/351 X |
| 4,040,047 | 8/1977 | Hareng et al. | 350/351 X |
| 4,293,435 | 10/1981 | Portugall et al. | 252/299.01 |
| 4,598,978 | 7/1986 | Mourey et al. | 350/350 S X |
| 4,639,089 | 1/1987 | Okada et al. | 350/350 S X |
| 4,639,722 | 1/1987 | Urabe et al. | 350/350 S X |
| 4,675,699 | 6/1987 | Kan et al. | 350/351 X |
| 4,702,558 | 10/1987 | Coles et al. | 350/351 X |
| 4,852,075 | 7/1989 | Feyrer et al. | 369/100 |

FOREIGN PATENT DOCUMENTS 0141512 5/1985 European Pat. Off. .
0205187 12/1986 European Pat. Off. .
2090673 7/1982 United Kingdom .

OTHER PUBLICATIONS

Patent Abstracts of Japan, vol. 10, No. 254 (1986) 80537.
Patent Abstracts of Japan, vol. 10, No. 266 (1986) 92453.
Pure and Appl. Chem., vol. 57, No. 11 (1985) 1589:1602.

*Primary Examiner*—Stanley D. Miller
*Assistant Examiner*—Huy K. Mai
*Attorney, Agent, or Firm*—Fitzpatrick, Cella, Harper & Scinto

[57] ABSTRACT

An optical modulation method comprises writing in a ferroelectric having a glass transition point at or above the glass transition point, and holding the resultant written state below the glass transition point. Preferably, the ferroelectric is formed in an optical modulation layer set to have an optical thickness capable of providing a multiple reflection state. The multiple reflection state of the optical modulation layer is locally changed at or above the glass transition point by irradiating the optical modulation layer under an electric field with a laser beam to write in the optical modulation layer.

48 Claims, 10 Drawing Sheets

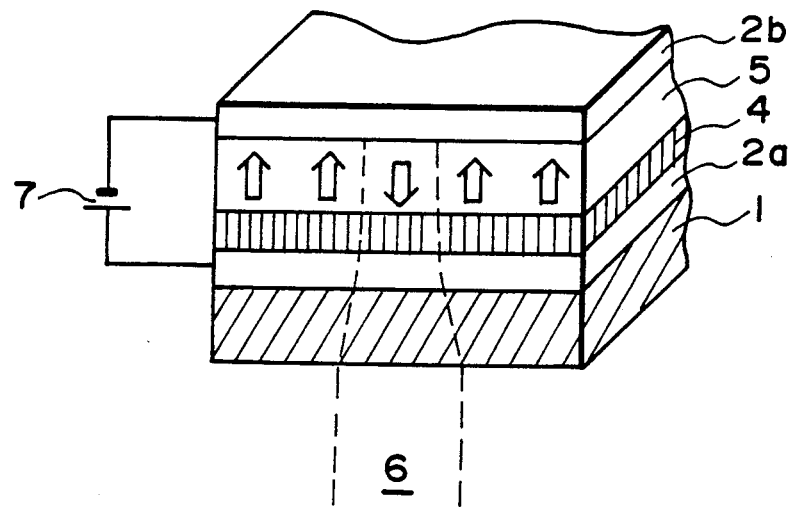
F I G. 1
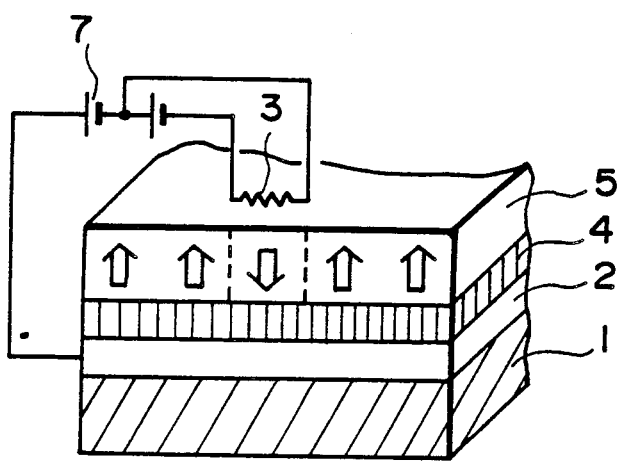
F I G. 2

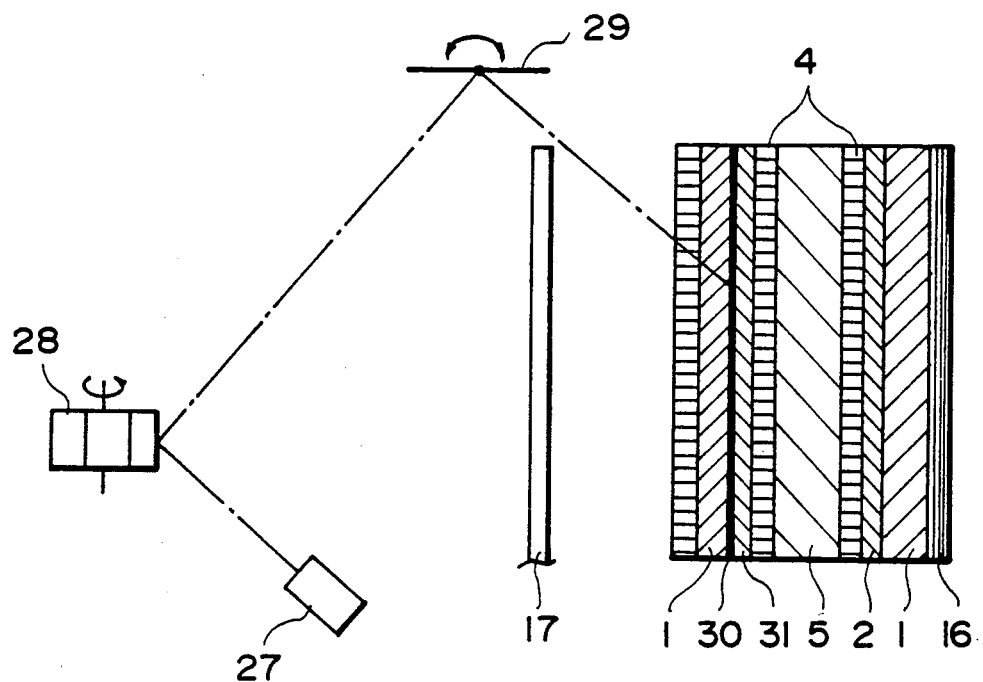
F I G. 11
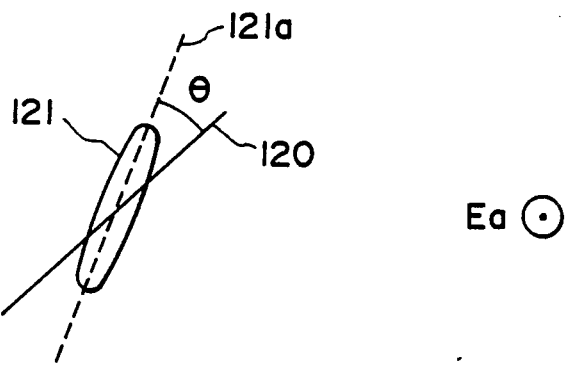
F I G. 12A
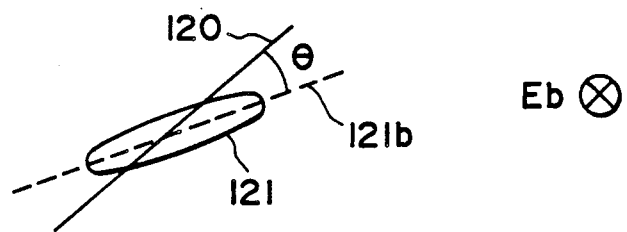
F I G. 12B

DEVICE, METHOD AND APPARATUS FOR OPTICAL MODULATION USING FERROELECTRIC POLYMER LIQUID CRYSTALS

FIELD OF THE INVENTION AND RELATED ART

The present invention relates to an optical modulation method involving steps for writing, recording information and optically detecting the recorded information, an optical modulation device of a simple structure for use in the method to form a high sensitivity display, and an optical modulation apparatus for effecting the method.

There have been known methods for writing and recording information by using a ferroelectric including one disclosed in Japanese Laid-Open patent application No. 215097/1984 wherein a polymer ferroelectric is used and one disclosed in Japanese Laid-Open patent application No. 45554/1972 wherein an inorganic ferroelectric is used. In these methods, however, the direction and size of recording media are affected by space charges, so that the recorded states are very poor in stability.

Further, various electro-optical rewritable recording media, such as (1) ferroelectric crystals, (2) ferroelectric polymers, (3) liquid crystals and (4) polymer liquid crystals have been proposed along with methods of recording and reading therefor. Among these, however, the recording method utilizing phase transition phenomena involves a problem in storability, and a method utilizing photomagnetic phenomena involves a problem that the recording apparatus for detecting rotation of a minute polarizing plane is expensive. On the other hand, the method utilizing the orientation under electric field of a polymer liquid crystal or a smectic liquid crystal is not satisfactory in respects of sensitivity and recording densities because two polarizers are used for readout of scattering or birefringence to lower the transmitted light quantity or a sufficient optical thickness is required to obtain a sufficient birefringence effect.

On the other hand, a device using a ferroelectric liquid crystal has been proposed to improve problems of conventional TN (twisted nematic)-type liquid crystal devices. The ferroelectric liquid crystal device still causes problems, such as instability of written or recorded state or cross-talk because a complete threshold characteristic is not obtained under repeating operations.

SUMMARY OF THE INVENTION

Accordingly, an object of the present invention is to provide an optical modulation method and an optical modulation device therefor having improved recording stability and capability of high-sensitivity recording.

A specific object of the present invention is to provide an optical modulation method capable of yielding stable written states and remarkably increasing the storability and stability in reading of the written states.

Another object of the present invention is to provide an optical modulation device having a large screen with many display pixels free from a lowering in contrast or crosstalk due to an increase in number of scanning lines.

A further object of the present invention is to provide an optical modulation method capable of effecting a display with a high transmittance and a high contrast.

A still further object of the present invention is to provide an optical modulation method capable of completely preventing deterioration of a written state at the time of reading and also capable of reading a high density recorded image at a high sensitivity.

According to the present invention, there is provided an optical modulation method comprising: writing in a ferroelectric having a glass transition point at or above the glass transition point, and holding the resultant written state below the glass transition point.

The present invention further provides an optical modulation apparatus comprising an optical modulation device comprising a pair of substrates having electrodes thereon and a ferroelectric having a glass transition point disposed between the substrates, whereby the ferroelectric is heated above the glass transition point and/or supplied with an electric field for each scanning line to effect writing; the written data are fixed (or placed in a memory state) by cooling the ferroelectric below the glass transition point; and the resultant change in birefringence of the written part is read out. The optical modulation apparatus can effect optical modulation free of decrease in contrast or crosstalk, which has not been accomplished heretofore.

The present invention further provides an optical modulation apparatus which includes an optical modulation device comprising an optical modulation layer of a compound capable of controlling its refractive index anisotropy by an electric field applied thereto, and means for controlling the optical thickness nd (n: refractive index, d: layer thickness) of the optical modulation layer to effect a display. More specifically, there is provided an optical modulation device comprising an optical modulation layer and reflection layers disposed on both sides of the optical modulation layer directly or by the medium of an insulating alignment control layer. An optical modulation apparatus is provided by combining the optical modulation device with means for controlling the optical thickness of the optical modulation layer and illuminating the optical modulation layer with readout light incident thereto to optically discriminate differences in reflectivity of the readout light from the optical modulation layer.

There is further provided an optical modulation apparatus having characteristics of stable recording, high sensitivity and high density by combining the above-mentioned optical modulation device comprising an optical modulation layer of a recording medium having a glass transition point with means for fixing the recorded state below the glass transition point and controlling the optical thickness of the optical modulation layer to read out the recorded state. More specifically, there is provided an optical modulation device including an optical modulation layer comprising an optical modulation compound which has a glass transition point and a refractive index anisotropy and is capable of changing its direction of refractive index anisotropy in response to an electric field applied thereto, a reflection layer, a semitransparent reflection layer and a polarizer. An optical modulation method is effected by using the optical modulation device and applying writing, recording and discrimination (readout) steps to the optical modulation layer having improved storability of the written state. The optical thickness ($n_1'd'$ and/or $n_2'd'$) of the optical modulation layer is controlled under application of an electric field, and the discrimination is performed by optically discriminating the reflected quantity of readout entering the optical modulation layer from the polarizer side ($n_1'$, $n_2'$: refractive indices at the recorded portion and the nonrecorded portion, respectively, of the optical modulation layer, $d'$: physical thickness of the optical modulation layer). An optical modulation apparatus adapted for performing the optical modulation method is also provided.

The present invention further provides an optical modulation method for irradiating an optical modulation layer having an optical thickness set to cause multiple reflection and irradiating the optical modulation layer with writing light and erasure light, whereby optical modulation is more effectively performed to provide records with excellent storability and rewritability.

These and other objects, feastures and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 through 3 illustrate embodiments of writing and recording in the optical modulation method of the present invention;

FIG. 11 illustrates a system for effecting the optical modulation method of the present invention on an optical modulation device;

FIG. 12 illustrates operation of a recording medium used in the present invention changing orientations corresponding to electric fields;

DETAILED DESCRIPTION OF THE PREFERRED EMBODIMENTS

In the present invention, a ferroelectric having a glass transition point (Tg) is used as the recording medium, and a recording state is retained below the glass transition point, whereby the stability of the recording is markedly improved. In the ferroelectric thus stabilized, the direction and magnitude of spontaneous polarization are not affected by a temperature change or a space charge, so that the record is durable for a long period of storage and the error occurrence rate is lowered.

Further, if the recording medium is stored below Tg, a stable reading is effected also when a change in birefringence corresponding to the direction of spontaneous polarization is read out by using cross nicol polarizers.

Figure 4:
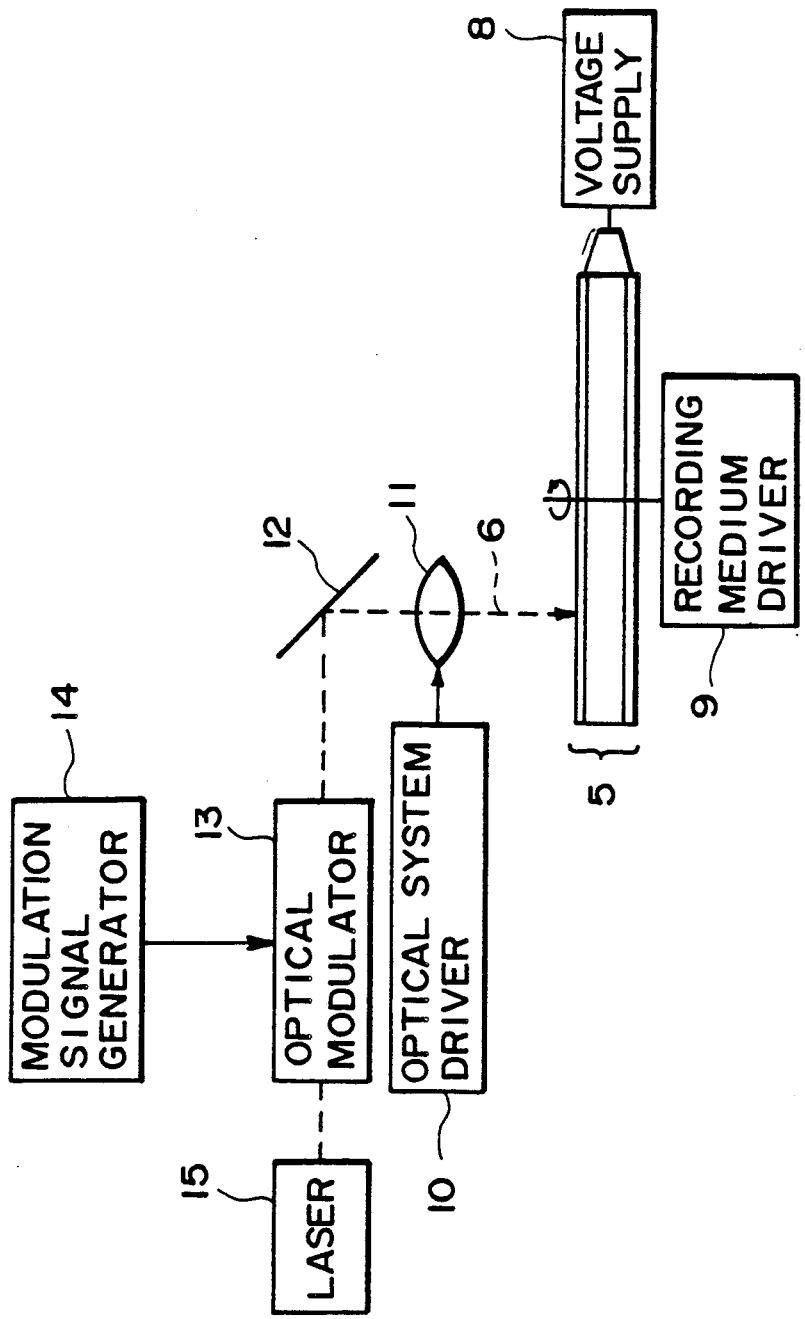
FIG. 4 is a schematic view for illustrating a system for writing in a recording medium by using a laser beam.

FIG. 4 illustrates a system for writing in such a recording medium comprising a ferroelectric having a glass transition point (Tg) by using a laser beam.

Referring to FIG. 4, the system comprises a recording medium having a recording layer of such a ferroelectric to be illuminated by a laser beam 6, a voltage application means 8, a recording medium driver 9, an optical system driver 10, an optical system 11, a reflecting mirror 12, an optical modulation means 13, a modulation signal generation means 14 and a laser 15.

As shown in the figure, a laser beam emitted from the laser 15 is passed through the optical modulator 13 and focused by the optical system 11 to be incident on the recording medium 5. In this instance, the part of the recording medium 5 to be illuminated by the laser beam for writing can be adjusted by the optical system driver 10 and the recording medium driver 9.

Figure 3:
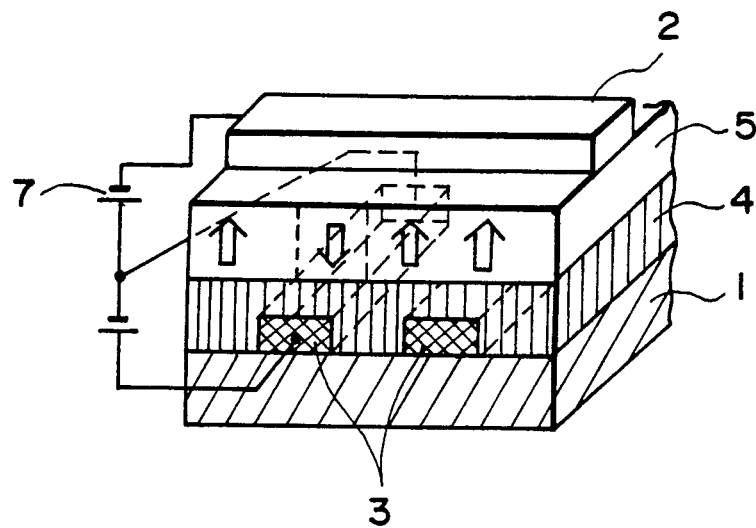

In the above embodiment, a laser beam is used to heat a writing part of the recording medium 5 to a temperature of Tg or above under application of an electric field, the heating may be effected by any means such as a thermal head comprising heat-generating elements or electrodes capable of selectively or locally heating the recording medium instead of a laser beam. FIGS. 1-3 show other embodiments of writing which will be explained based on Examples appearing hereinafter.

In the optical modulation method for writing and recording, a recording medium having a glass transition point is subjected to the above-described writing method, and then the temperature of the recording medium is lowered to below the glass transition point to retain the written state. In this instance, it is preferred that the ferroelectric constituting the recording medium has a glass transition point at or above room temperature, but too high a glass transition point causes problems in recording sensitivity and operation characteristics. For this reason, a polymer liquid crystal may preferably be used as a ferroelectric in the present invention.

A specific class of such a polymer liquid crystal comprises those represented by the following formula (25) as disclosed by N. A. Plati and V. P. Shibaev, Pure & Appl. Chem., 57, 1589 (1985).

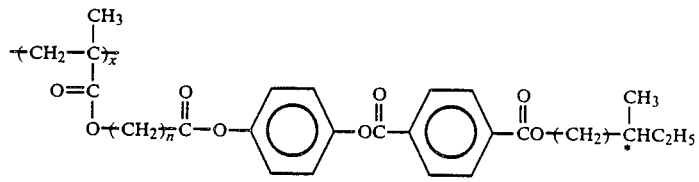

(25)

The polymer liquid crystal represented by the above formula (25) may have a glass transition point of about 20°–150° C by controlling the number n or x, or through copolymerization for introduction of another structure. It is also possible to mix polymer liquid crystals with different ns or to mix a polymer with another material. In the present invention, the number n is preferably 2–100, more preferably 5–15, and the number x is preferably 2–12. The recording layer or optical modulation layer comprising the recording medium may preferably have a thickness of 1000 Å–100 μ, more preferably 100 Å–10 μ.

The writing state is explained in further detail.

The optical modulation layer used in the present invention, when once heated and then gradually cooled, can form a recording layer homogeneously aligned or oriented with respect to electrodes.

Writing is effected on the recording layer in the homogeneous alignment state. In this instance, if an electric field is applied at the time of the gradual cooling, a recording layer having a uniform alignment state is obtained. For this reason, it is possible to selectively heat a writing part of the recording layer in such a uniform alignment state and apply a reverse electric field to change the alignment direction to effect writing.

However, the optical modulation layer or recording layer used in the present invention comprises small domains, so that they can be discriminated from a recording state after writing even if the recording layer is simply cooled gradually after being heated without application of an electric field for providing a uniform alignment state. For this reason, the writing of the present invention can be applied to the recording layer after heating to a temperature above Tg once and then gradual heating.

Now, the reading operation is explained.

FIG. 12 is a schematic illustration of a reading operation using a ferroelectric in the present invention. FIG. 12 shows two orientation states 121a and 121b of molecules 121 in a smectic phase with respect to a normal 120 to a smectic molecular layer. The normal 120 generally extends in a plane in parallel with the substrates.

Referring to FIG. 12, a molecule of ferroelectric constituting the recording medium has a dipole moment (not shown, extending perpendicularly to the drawing) in the direction perpendicular to the molecular axes 121a and 121b. When a DC voltage exceeding a certain threshold is applied across a pair of electrodes on the substrates, the dipole moments of the molecules are uniformly oriented in the direction of the electric field to change the orientation of the molecules. More specifically, as shown in FIG. 12, an electric field Ea or Eb (extending from the back side to the front side or reversely) of different polarities exceeding a certain threshold is applied to a molecule 121, the dipole moment of the molecule is changed to be in alignment with the electric field Ea or Eb so that the molecule 121 assumes the state shown at A or B forming a tilt angle θ with respect to the normal 120. Accordingly, if a pair of polarizers are disposed in cross nicols so as to sandwich the glass substrates, an optical modulation device changing its optical characteristic depending on the polarity of the electric field applied whereby reading is effected. FIG. 12 corresponds to a case where the molecule has a positive $P_S$ (spontaneous polarization), and a molecule having a negative $P_S$ assumes a state of B in response to Ea and A to Eb.

In the present invention, a change in optical characteristic (birefringence effect) of the recording medium written by application of voltages of different polarities is read out. The reading is effected with the recording medium placed below the glass transition point in the present invention. In the reading operation, even if the recording layer is heated to some extent by readout light, the recorded information is not disturbed due to an internal electric field.

Figure 8:
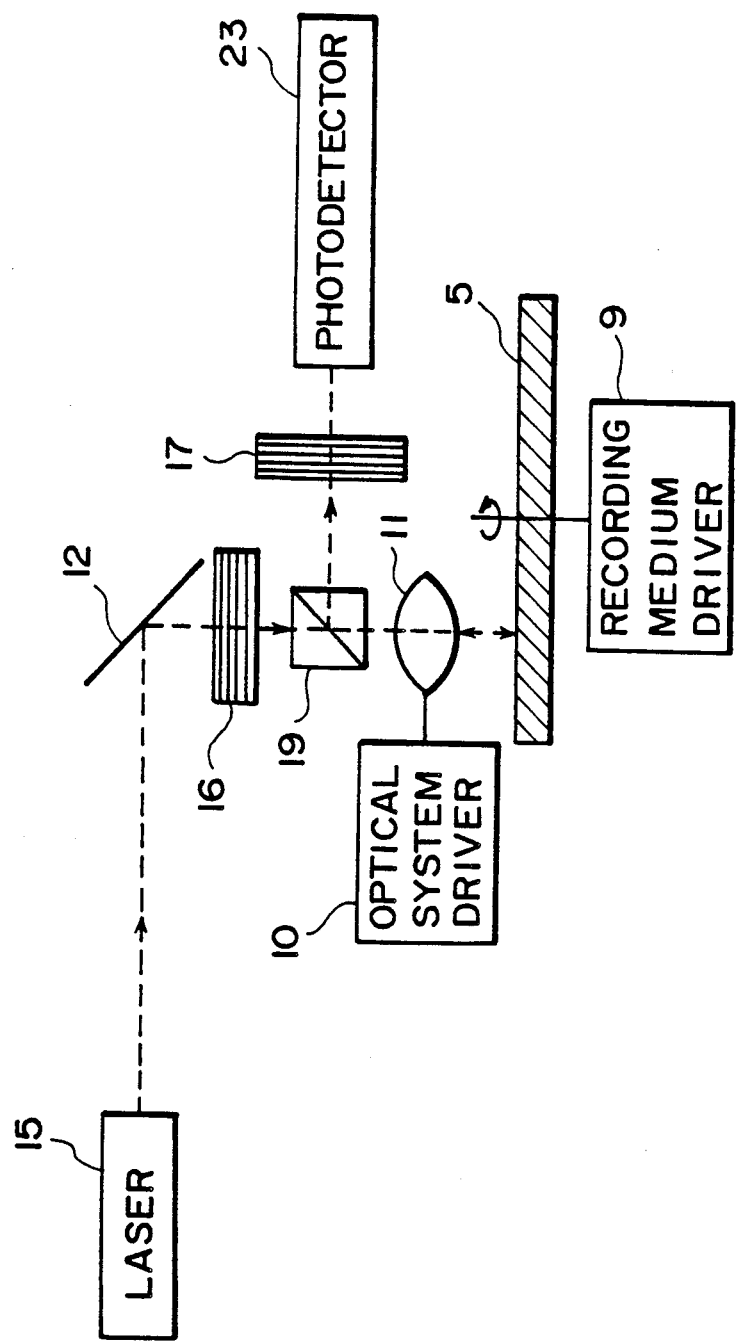
FIG. 8 illustrates a system for reading from a recording medium by using a readout laser beam.

FIG. 8 shows a system for irradiating the recording medium with readout light for reading.

Referring to FIG. 8, the system comprises a ferroelectric polymer liquid crystal, a recording medium driver 9, an optical system driver 10, an optical system 11, a reflecting mirror 12, a readout laser beam generator 15, a polarizer 16, an analyzer 17, a beam splitter 19, and a photodetector 23.

As shown in FIG. 8, a laser beam emitted from the laser beam generator 15 is adjusted with respect to its direction by the mirror 12, passed through the polarizer 16, the beam splitter 19 and the optical system 11, and is incident on the recording medium 5. Then, the reflected light from the recording medium 5 is passed through the beam splitter 19 again and the analyzer to be read by the photodetector 23. During the reading operation, the part of the recording medium to be read by irradiation of a laser beam can be controlled by the optical system driver 10 and the recording medium driver 9.

Figure 9:
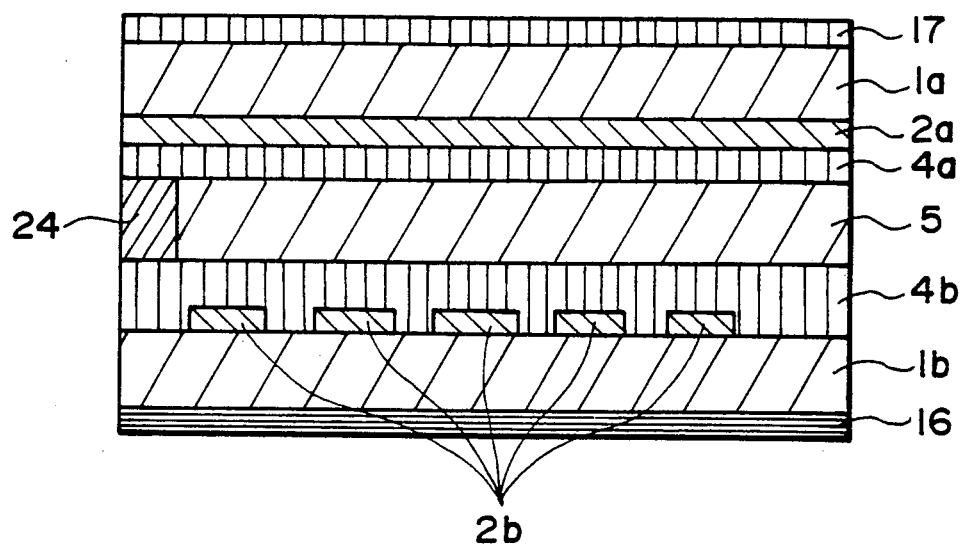
FIG. 9 is a sectional view of an embodiment of the optical modulation device according to the present invention.

FIG. 9 shows an embodiment of the optical modulation device which comprises a recording medium as described above disposed between a pair of parallel substrates.

Referring to FIG. 9, the optical modulation device comprises substrates 1a and 1b, electrodes 2 (which may be transparent), insulating alignment control layers 4a and 4b, a ferroelectric polymer liquid crystal layer 5, a polarizer 16, an analyzer 17, and a spacer 24.

The liquid crystal layer 5 in the cell structure shown in FIG. 9 may assume a chiral smectic phase, such as SmC*, SmH*, SmF*, SmI* and SmG*. On the two glass substrates 1a and 1b, transparent electrodes or electrodes 2a and 2b comprising thin films of $In_2O_3$, $SnO_2$, ITO (indium-tin-oxide), etc., are disposed respectively. These electrodes are coated with films of a polymer, such as polyimide, which is then rubbed with gauge or acetate fiberplanted cloth to provide insulating alignment control layers 4 for aligning liquid crystal molecules in the direction of the rubbing. The insulating layer can assume a two-layer structure comprising an inorganic insulating layer of, e.g., silicon nitride, silicon carbide containing hydrogen, silicon oxide, boron nitride, boron nitride containing hydrogen, cerium oxide, aluminum oxide, zirconium oxide, titanium oxide, and magnesium oxide, coated thereon with an alignment control layer of an organic material, such as polyvinyl alcohol, polyimide, polyamideimide, polyesterimide, polyparaxylylene, polyester, polycarbonate, polyvinyl acetal, polyvinyl chloride, polyvinyl acetate, polyamide, polystyrene, cellulose resin, melamine resin, urea resin, acrylic resin, and photoresist resin. Alternatively, the insulating alignment control layer may comprise a single layer of an inorganic material or an organic material as described above. Further, an alignment control layer can be formed on only one of the substrates 1a and 1b. An inorganic insulating alignment control layer may be formed by vapor deposition. An organic insulating alignment control layer may be formed by applying a solution of an organic insulating material as described above or a precursor thereof in a concentration of 0.1-20 wt.%, preferably 0.2-10 wt.%, onto a substrate by spinner coating, dipping, screen printing, spray coating, roller coating, etc., followed by curing under prescribed curing conditions (e.g., under heating). The thickness of the insulating alignment control layer may ordinarily be 20 Å–1 μ, preferably 30 Å–5000 Å, further preferably 50 Å–3000 Å.

The thus treated two glass substrates 1a and 1b are secured to each other with a prescribed spacing by using a spacer 24. For this purpose, silica beads or alumina beads, for example, having a prescribed diameter may be sandwiched between the two substrates, and the periphery of the substrates may be hermetically sealed by using an epoxy adhesive, etc. Further, a polymer film or glass fiber can also be used as a spacer. Between the two substrates thus forming a cell, an optical modulation material such as a ferroelectric polymer liquid crystal is disposed hermetically.

The transparent electrodes 2a and 2b are connected to an external voltage supply through lead wires. Onto the other sides of the substrates 1a and 1b, a polarizer 16 and an analyzer 17 are applied.

When an optical modulation device is constituted, electrodes on the substrates may be arranged to form a matrix. An example of such a matrix electrode structure is shown in FIG. 10.

Figure 10:
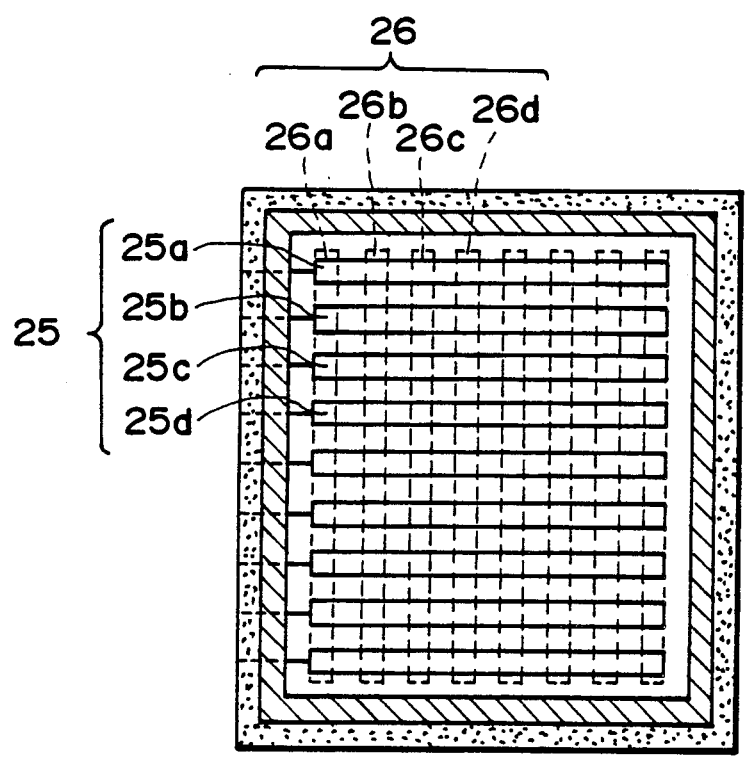
FIG. 10 illustrates a matrix arrangement of scanning electrodes and signal electrodes in an optical modulation device.

Referring to FIG. 10, on a substrate 1a, a group of transparent electrodes 25 (25a, 25b, 25c, ...) (e.g., a group of electrodes for supplying a scanning voltage in the matrix electrode structure) are formed in a prescribed pattern, such as stripes. On the other substrate 1b, a group of transparent electrodes 26 (26a, 26b, 26c, ...) (e.g., a group of electrodes for supplying signal voltages in the matrix electrode structure) are formed so as to intersect with the transparent electrodes 25 and form a pixel at each intersection.

When the above-described optical modulation method including writing, recording and reading is applied to the thus produced optical modulation device, the optical modulation material at respective pixels on a scanning line is heated and supplied with an electric field to select a written state, which is then fixed when cooled below the glass transition point, and the fixed written state is read out by utilizing the change in optical state (more specifically, birefringence). These operations are effected for each scanning line. The optical modulation device when used in this type of optical modulation method shows a performance which is not substantially affected by an increase in number of scanning lines and cannot be attained by a conventional matrix device. When the optical modulation material such as a polymer liquid crystal is heated to above its glass transition point by irradiation of a light beam, it is also effective to add a substance showing an absorption characteristic to the wavelength of the light beam.

As a method of reading the recorded information, the following method is also effective. In this case, the optical modulation material comprises a compound, the refractive anisotropy of which can be controlled by an electric field. Specific examples of such a compound may include the following liquid crystal, ferroelectric liquid crystal, polymer liquid crystal or ferroelectric polymer liquid crystal. The liquid crystal layer to be used in this mode may be formed in a chiral smectic phase such as SmC*, SmH*, SmF*, SmJ*, SmK*, SmI* or SmG*, or a nematic phase. Nematic liquid crystals having Δε (dielectric anisotropy) >0:

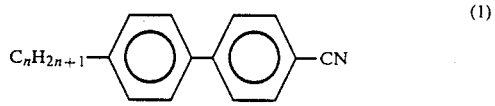

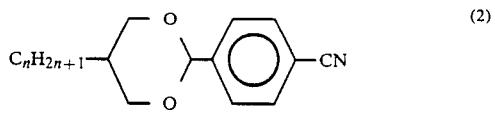

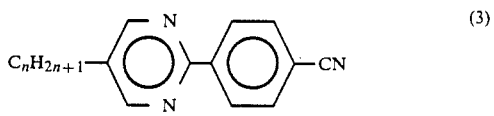

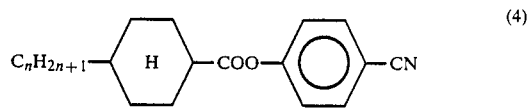

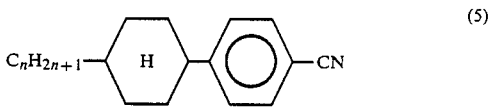

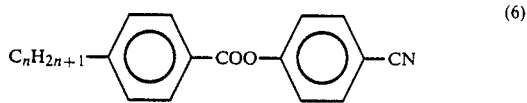

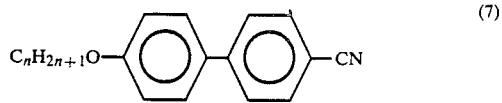

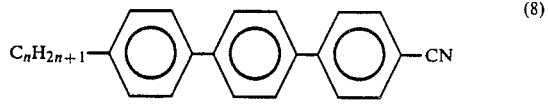

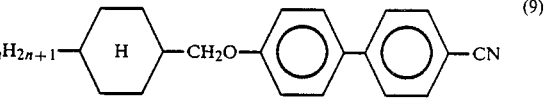

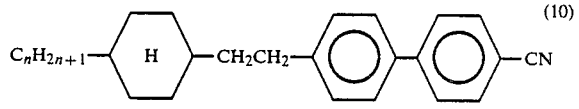

Neumatic liquid crystals having Δε<0:

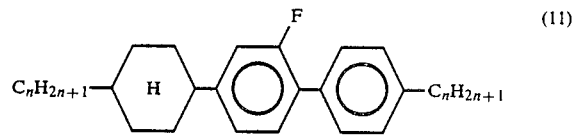

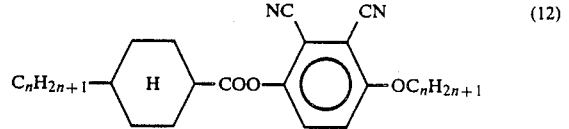

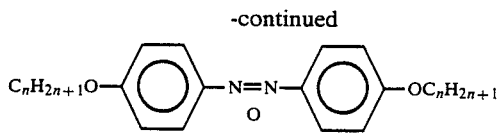
Ferroelectric liquid crystals:
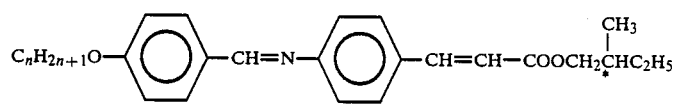
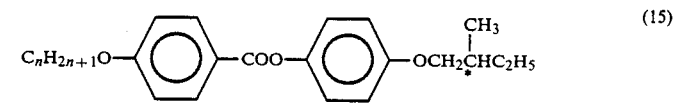
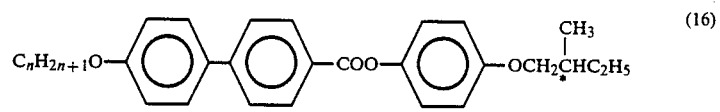
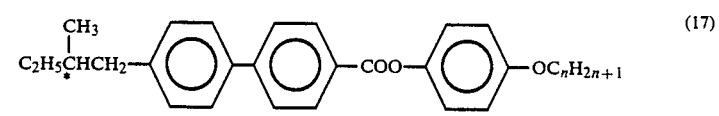
Polymer liquid crystal showing a neumatic phase with $\Delta\epsilon<0$:
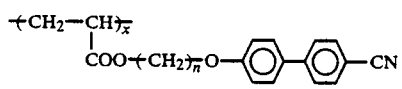
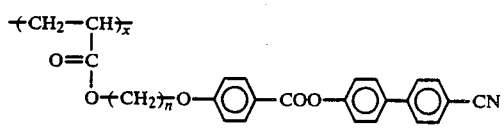
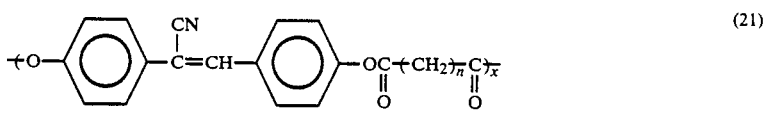
Polymer liquid crystals showing a neumatic phase with $\Delta\epsilon<0$:
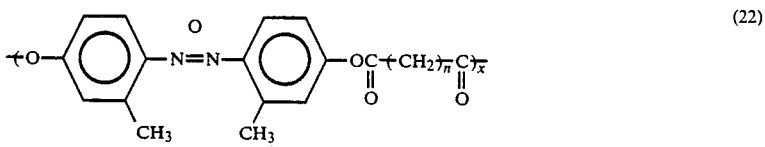
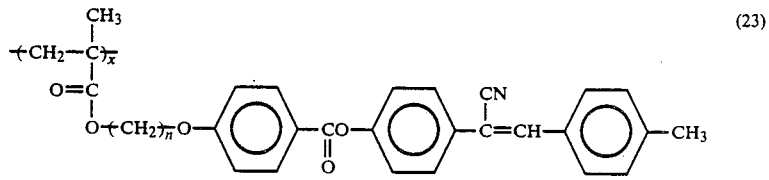
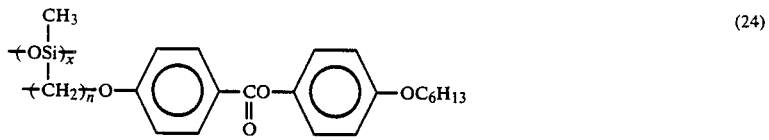
Ferroelectric polymer liquid crystal:
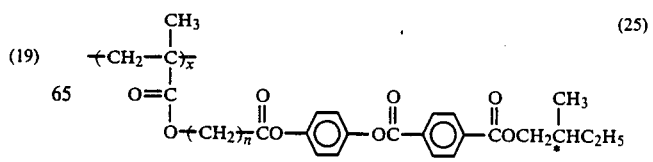

Figure 13:
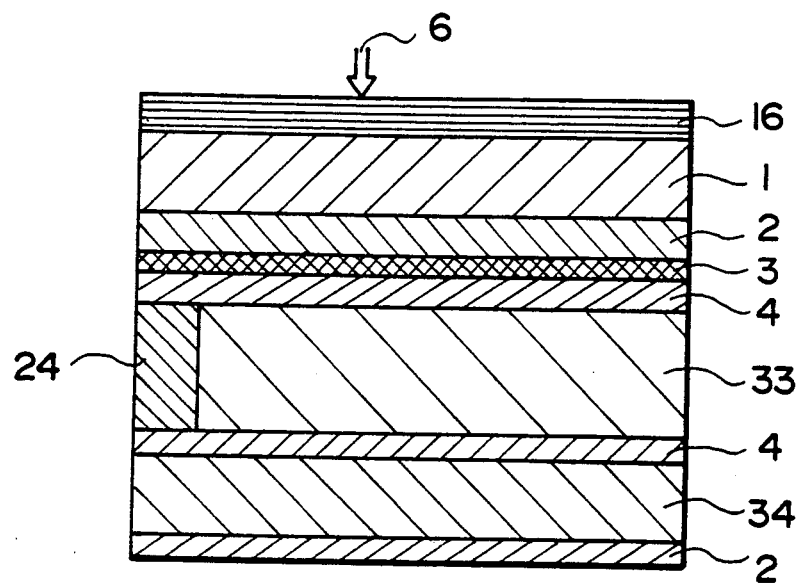
FIG. 13 is a sectional view showing an embodiment of the optical modulation device according to the present invention.

In this embodiment, an optical modulation layer 33 comprising a compound as described above is disposed in an optical modulation device as shown in FIG. 13.

Referring to FIG. 13, the optical modulation device comprises an optical modulation layer 33 as described above, insulating alignment control layers 4, a semitransparent reflecting layer 32, electrodes 2, a transparent substrate 1, a polarizer 16, a spacer 24, and a reflecting layer 34.

Figure 14:
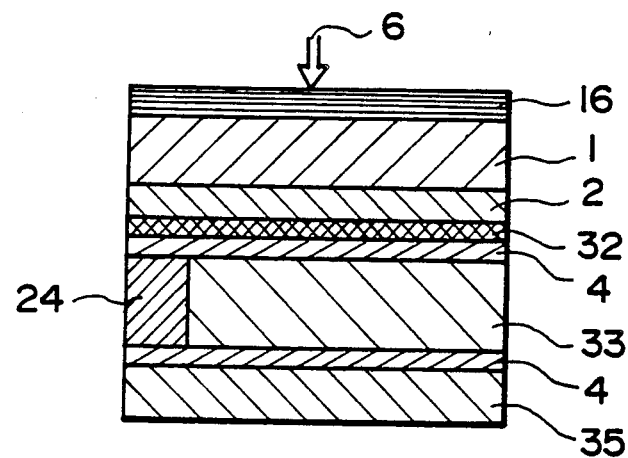
FIGS. 14 and 15A are sectional views each showing another embodiment of the optical modulation device according to the present invention.

FIG. 14 shows another embodiment of the optical modulation device of this type wherein one electrode 2 and the reflecting layer are combined into an electrode and reflection layer 35.

The operation of this type of optical modulation device will now be explained with reference to FIG. 14. First of all, a light beam 6 is caused to enter the device from the polarizer 16 side. The light beam passes through the semitransparent reflecting layer 32 and reaches the electrode and reflecting layer 35, where the light beam is reflected. As a result, the reflected beam returns to the semitransparent reflecting layer 32. In this instance, if the optical thickness between the layers 32 and 35 is controlled so that the incident light and the reflected light cause interference, the reflected light does not pass through but is reflected also at the semitransparent reflecting layer 32 to cause reciprocation between the semitransparent reflecting layer 32 and the electrode and reflecting layer 35. The light beam having travelled along a remarkably increased optical path finally passes through the semitransparent reflecting layer 32 to be detected as a reflected beam. Here, such a state of reciprocal movement of an incident light beam is referred to as a "multiple reflection state". Such a multiple reflection state can be caused even in the absence of the semitransparent reflecting layer 32. It is however preferred that such a semitransparent reflecting layer 32 is present in order to effectively provide a multiple reflection state. In the case where the semitransparent reflecting layer 32 is not present, a multiple reflection state is provided between the transparent electrode 2 and the reflecting electrode 35 if the refractive indices of the layers 2, 4 and 33 are set to satisfy the no reflection condition, i.e., to satisfy the relation $f$ (refractive index of electrode 2)×(refractive index of electrode 35)=(average reflective index of the two alignment layers 4 and the optical modulation layer 33)$^2$ The multiple reflection state also relates to the wavelength ($\lambda$) of the incident light which is determined corresponding to the optical thickness. As a result of multiple reflection, the optical path is extremely increased, so that if a layer absorbing the incident light even at a small percentage is present among the layers where multiple reflection occurs, the quantity of light detected as the reflected light can be minimized (i.e., the reflectivity can be minimized).

Then, from the first state as described above as a reference, the molecular alignment state of the optical modulation layer is changed, so that there results in a second state that the reflected light passes the semitransparent reflecting layer 32. The reflected light quantity in this state is measured as a reflectivity relative to the incident light and is compared with the value in the first state. A display can be effected as a contrast between the reflectivities in the first and second states. In the manner as described above, by utilizing the contrast between the first and second states, a high sensitivity discrimination state can be achieved to a level which has not been obtained heretofore.

In the above, explanation is made on a display example wherein the reflectivity is changed from a minimum to a higher level to provide a contrast for display. Alternatively, it is also possible to first set a high reflectivity condition and then gradually decrease the reflectivity to provide a contrast used for giving a display.

In case where a compound having a negative $\Delta\epsilon$ is used as an optical modulation compound having a birefringence and being capable of changing its birefringence in response to an electric field applied thereto to constitute the optical modulation layer, it is preferred to form a homeotropic alignment.

The variation in optical thickness $\Delta$nd ($=n_1d-n_2d$) used in the present invention may preferably be 0.2 $\mu$m or less, particularly preferably 0.001-2 $\mu$m, and most preferably 0.001-1 $\mu$m. This means that a compound with an ordinary refractive index anisotropy ($\Delta n=0.001-0.5$) can provide a high sensitivity and a high contrast at a very thin physical thickness d thereof. The physical thickness d can be made smaller as a larger $\Delta n$ is attained. The physical thickness of the optical modulation layer d may preferably be set to 1 $\mu$m or less, more preferably 100 to 8000 Å.

Herein, $n_1$ and $n_2$ refer to the average refractive indices at a recorded portion and a non-recorded portion, respectively, of the layers concerned in multiple reflection. If the optical modulation layer comprises a liquid crystal, the largest change in optical thickness is obtained when the optical modulation layer is controlled so that $n_1$ and $n_2$ assume $n\perp$ and $n\parallel$, respectively, of the liquid crystal. In case where a compound having a refractive index anisotropy is used, the plane of polarization of a linear polarized light beam is selected so as to provide a maximum difference in refractive index before and after a change in refractive index anisotropy.

The optical thickness of the optical modulation layer can be controlled by changing the refractive index or refractive index anisotropy of the optical modulation layer. More specifically, it may be accomplished by changing the refractive index through a phase transition of the optical modulation layer or by changing the refractive index anisotropy through control of an electric field or magnetic field applied to the optical modulation layer. It is particularly advantageous to change the refractive index anisotropy of the optical modulation layer by applying and controlling an electric field across the optical modulation layer because of high speed modulation and small energy consumption.

Further, in order to provide a clearer contrast, it is possible to add a colorant in the optical modulation layer. Examples of the colorant used for this purpose may include the following:

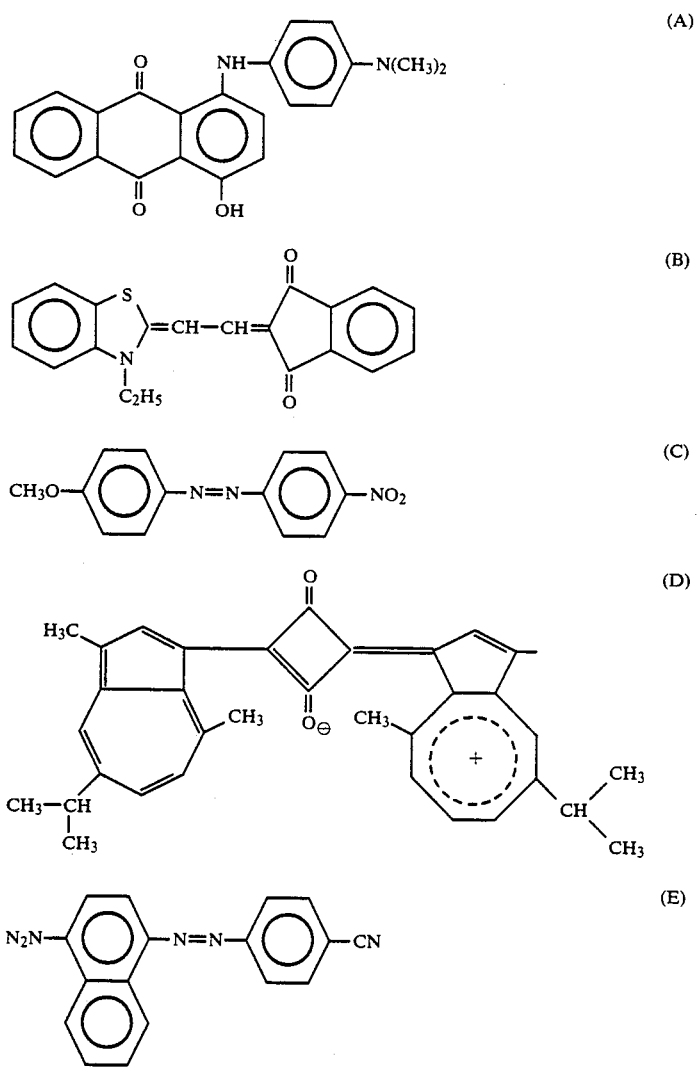

Other colorants may also be used for this purpose.

The semitransparent reflecting layer 32 may have a transmittance of 5 to 95%. Examples thereof may include a thin film of a metal, such as aluminum, gold, silver or copper having a thickness of 10 Å–2000 Å, preferably 50 Å to 800 Å, or a film of an inorganic oxide or a high-refractive index compound such as ZnS having a thickness of 10 to 5000 Å.

Referring to FIG. 13, the substrate 1 coated with a transparent electrode 2 and the insulating alignment control layers 4 may be formed in the same manner as the substrates 1a, 1b and the insulating alignment control layers 4a, 4b in the embodiment shown in FIG. 9.

The spacing between the transparent substrate 1 and the reflecting layer may be set to provide a prescribed value by the spacer 24. The electrodes 2 are connected to an external power supply. On the outside of the transparent substrate 1 is disposed a polarizer 16.

The reflecting layer 34 and the electrode 2 may be combined into, for example, a single metal substrate functioning as an electrode and reflecting layer 35 (FIG. 14).

Similarly, if the surface of the electrode 2 on the reflecting layer 2 side is provided with a function of the reflecting layer 34, the reflecting layer 34 can be omitted.

On the other hand, one of the electrodes 2 through which incident light enters must be a transparent electrode.

Figure 15A:
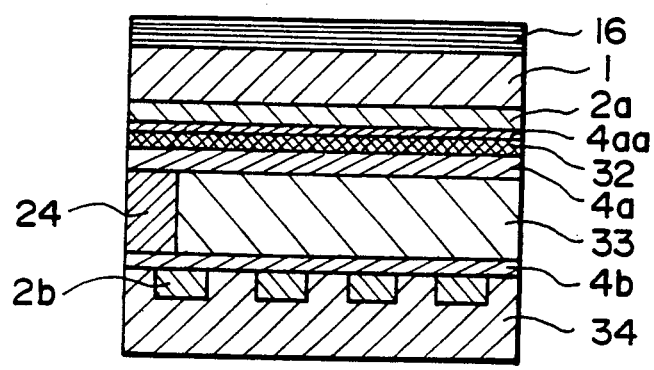
Figure 15B:
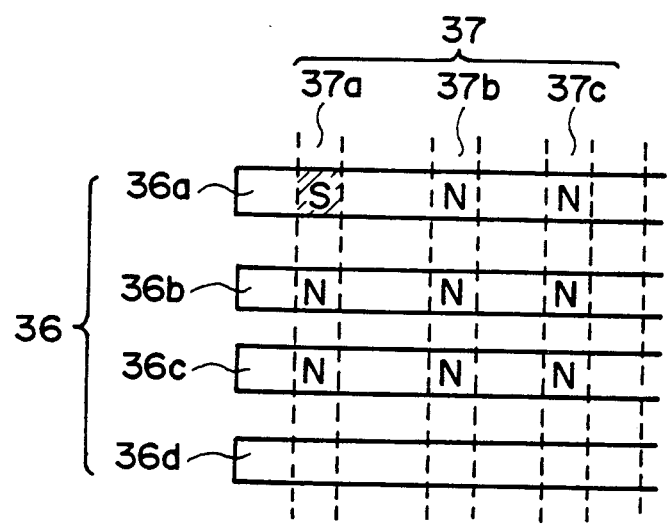
FIG. 15B illustrates a matrix arrangement of scanning electrodes and signal electrodes.

The electrodes 2 on the respective sides may be divided into a plurality so as to form a matrix structure in combination as shown in FIGS. 15A and 15B. At this time, the optical modulation or display state change in the optical modulation layer is selectively effected at an S-intersection (selected pixel) and is not effected at N-intersection (non-selected pixels) as shown in FIG. 15B.

Figure 16:
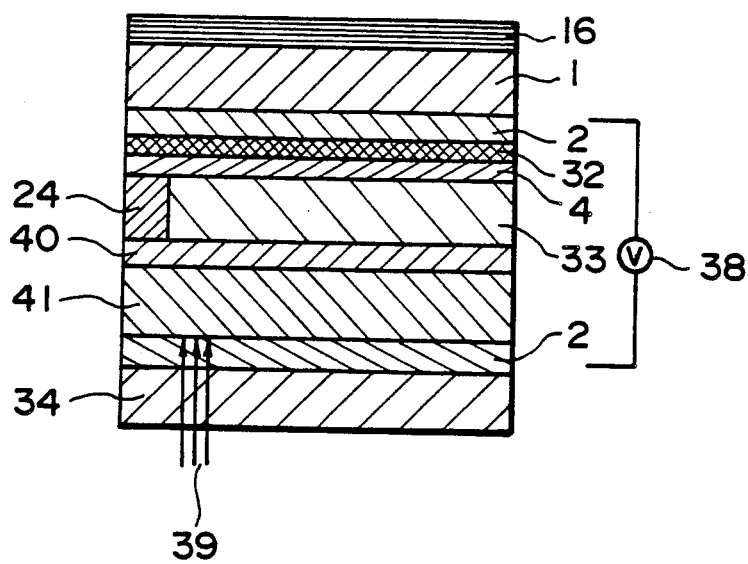
FIG. 16 is a schematic illustration of an optical modulation device for explaining an operation in Example 14 appearing hereinafter.

FIG. 16 shows another embodiment of the optical modulation device of the present invention, wherein a photoconductive layer is disposed and a dielectric mirror 40 is used as a reflecting layer.

In another embodiment of the optical modulation device of the present invention, among those compounds represented by the formulas (1)–(25) having a refractive index anisotropy controllable by an electric field, particularly those represented by the formulas (18)–(25) having a glass transition point are used to constitute an optical modulation layer. An optical modulation apparatus characterized by stability of recording and capable of effecting a display of a high transmittance and a high contrast can be constituted by combining the optical modulation device with recording means for writing in the optical modulation layer at or above the glass transition point of the optical modulation compound and holding the resultant written state below the glass transition point, said recording means including optical modulation means for changing the optical thickness of the optical modulation layer to change the multiple reflection state of the optical modulation layer; and means for illuminating the optical modulation layer with readout light to optically discriminate the multiple reflection state as a difference in quantity of reflected light. The optical modulation means may preferably comprise voltage application means.

Further, by using the above-mentioned type of optical modulation device comprising an optical modulation layer of a polymer liquid crystal or a ferroelectric polymer liquid crystal having a glass transition point and a refractive index anisotropy controllable by an electric field as represented by the formulas (18)–(25) in combination with the principle of multiple reflection and means for stabilizing a recorded state below the Tg, a more effective optical modulation system capable of rewriting (i.e., writing and erasing) recorded images is provided.

The system may be operated in the following manner. With reference to FIG. 14, an incident light beam 6 is caused to enter the device from the polarizer 16 side. The light passes through the semitransparent reflecting layer 32 and reaches the electrode and reflecting layer 35 where the light beam is reflected. As a result, the reflected light returns to the semitransparent reflecting layer 32. Here, the optical thickness of the optical modulation is set to a prescribed value causing multiple reflection as described above.

In this instance, if a colorant absorbing the wavelength of the incident light for writing is contained in the optical modulation layer, the light is absorbed during the multiple reflection to be converted into heat.

In other words, a portion of the optical modulation layer causing the multiple reflection is heated. At this time, the temperature of the heated portion is raised above the glass transition point (Tg), and at the temperature, the heated portion is supplied with an electric field to change molecular optical axes of the optical modulation layer, whereby writing is effected.

The writing data are retained by cooling the optical modulation layer below the Tg. Further, reading is carried out by illuminating the optical modulation layer with readout light having an intensity not heating the optical modulation layer above Tg to discriminate a difference in reflectivity of the written portion and non-written portion of the optical modulation layer.

Further, the condition for establishing multiple reflection can be varied if a light beam having a plane of polarization or/and a wavelength different of that of the writing beam is used whereby the written portion can be set to another condition for establishing multiple reflection. Then, by using such a light beam different from the writing beam as an erasure light beam, multiple reflection is again caused at the written portion to be heated by the erasure beam above Tg. If an electric field of the opposite polarity is applied in this state, the written data can be erased thereby.

As described hereinabove, according to the present invention, a very stable recording state is realized and also a high speed recording is effected by a simple operation in a recording method of effecting recording by selecting the direction of the spontaneous polarization of a ferroelectric.

Further, in a recording medium comprising a ferroelectric having a glass transition point, recorded data are read out by utilizing a change in birefringence at a temperature below the glass transition point, whereby high-speed readout is realized in a non-contact mode and the stability of reading is remarkably improved at the time of reading.

Further, with the optical modulation utilizing such a recording medium as described, the writing, recording and reading are combined, whereby a display is realized having substantially eliminated difficulties such as a decrease in contrast and crosstalk accompanying densification and enlargement of a display picture.

Further, according to an embodiment of the present invention, only one polarizer is used for readout, so that an optical modulation device with little loss in light quantity and excellent contrast is obtained. Furthermore, in the optical modulation device according to the present invention, even if the optical modulation layer is made thinner than in the conventional liquid crystal device, the contrast is not lowered, so that the driving voltage can be decreased. Further, high-sensitivity recording can be effected in a non-contact mode, and partial erasure has become also possible.

Hereinbelow, the present invention is explained more specifically with reference to Examples and drawings.

EXAMPLE 1

Referring to FIG. 1, a glass substrate 1 provided with a transparent electrode 2a formed by sputter deposition was further coated with a polyamic acid solution (PIQ, available from Hitachi Kasei Kogyo K.K.; non-volatile content: 3.0 wt. %) by a spinner coater, followed by heating for 30 minutes at 120° C., for 60 minutes at 200° C. and for 30 minutes at 350° C. to form a polyimide alignment layer 4, which was then subjected to rubbing to have a uniaxial orientation characteristic.

On the alignment layer 4, a solution (nonvolatile content: 10 wt. %) of a polymer liquid crystal represented by the formula 26 below was applied by a spinner coater, dried at 100° C and then gradually cooled to room temperature (about 25° C) to form a polymer liquid crystal layer 5 in a thickness of about 3 μm, which was then coated with an upper electrode 2b by vapor deposition of aluminum to obtain a device as shown in FIG. 1.

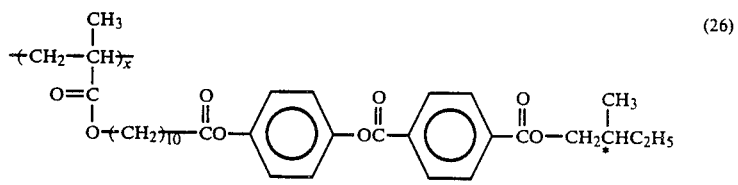

(26)

(The polymer liquid crystal compound represented by the above formula (26) showed a glass transition point of 30° C by DSC (differential scanning calorimetry).

In the device, an electric field of 10 V was applied between the transparent electrode 2a and the upper electrode 2b, and simultaneously the optical modulation layer 5 was heated to above the glass transition point by irradiating a laser beam 6 to uniformize the spontaneous polarization of the heated portion of the optical modulation layer 5. Then, the device was cooled to below the glass transition point, whereby data were written and recorded. The resultant recording state of the optical modulation layer was not deteriorated as a result of observation through a polarizing microscope even after repeated application of a reverse electric field of −10 V at room temperature.

EXAMPLE 2

Referring to FIG. 2, a substrate 1 of polycarbonate provided with a vapor-deposited aluminum electrode 2 was further coated with a PVA aqueous solution (Poval available from Kuraray K.K.; nonvolatile content: 3.0 wt. %) by a spinner coater, followed by drying at 100° C under reduced pressure and rubbing to provide an alignment layer 4 with a uniaxial alignment characteristic.

On the alignment layer 4, a solution (nonvolatile content: 10 wt. %) of the polymer liquid crystal represented by the above formula (26) was applied by a spinner coater dried at 90° C and gradually cooled, thereby to obtain an optical modulation device having a polymer liquid crystal layer 5 as shown in FIG. 2.

For the device, the recording layer 5 was heated by a heating electrode 3 to a temperature of about 50° C. above the glass transition point and simultaneously supplied with an electric field of 5 V between the electrode 2 and the heating electrode 3. Thereafter, the heating was stopped and the recording layer was coated to room temperature, whereby recording was effected. The resultant recording state did not cause deterioration as a result of observation through a polarizing microscope even after repeated application of a reverse electric field of −5 V at room temperature.

EXAMPLE 3

Referring to FIG. 3, a glass substrate 1 provided with a vapor-deposited ITO electrode 2 was further coated with a positive type resist solution (available from Shipley Co.) by a spinner coater, followed by pre-baking. The resist layer was exposed to light through a stripe mask having a mask width of 7 μ and a mask pitch of 10 μ and then developed with a developer liquid "MF 312" containing tetramethylammonium hydroxide to remove the resist at the exposed part. Then, the ITO electrode was etched. After washing with water and drying, the non-exposed portion of the resist was removed by MEK (methyl ethyl ketone) to form lower electrodes 3. Then, a polyamic acid solution (available from Hitachi Kasei Kogyo K.K.) was applied thereon by a spinner coater, followed by heating for 30 minutes at 120° C, for 60 minutes at 200° and for 30 minutes at 350° C to form a polyimide film 4.

On the polyimide film 4, a solution (nonvolatile content: 10 wt. %) of the polymer liquid crystal of the above formula (26) was applied by a spinner coater, dried at 100° C and then gradually cooled, whereby a uniformly homogeneously aligned polymer liquid crystal layer 5 was obtained. Then, an aluminum film was vapor-deposited and patterned by using the positive-type resist in the same manner as in the formation of the lower electrodes 3 to form a stripe electrode 2 perpendicularly intersecting with the lower electrodes, thereby to obtain a recording medium as shown in FIG. 3.

In the recording medium, a lower electrode 3 was energized to heat the recording layer 5 and a voltage of 10 V was applied between the lower electrode 3 and an upper electrode 2. Thereafter, the heating was stopped and the medium was cooled to room temperature to complete recording. The resultant recording state did not cause deterioration as observed through a polarizing microscope even after repeated application of a reverse electric field of −10 V.

EXAMPLE 4

Figure 5:
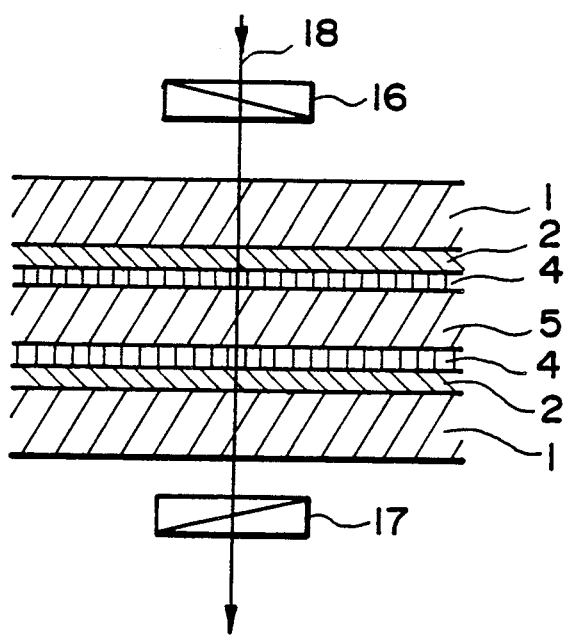
FIGS. 5-7 illustrate embodiments of reading in the optical modulation method according to the present invention.

Referring to FIG. 5, a glass substrate provided with an ITO electrode 2 was coated with a polyamic acid solution ("PIQ" available from Hitachi Kasei Kogyo K.K.; non-volatile content: 3 wt. %) by a spinner coater rotating at 3000 rpm in 30 seconds, and the coating was heated for 30 minutes at 120° C, for 60 minutes at 200° C and for 30 minutes at 350° C to form a polyimide alignment layer 4 which was then provided with a uniaxial orientation characteristic by rubbing. On the layer 4, a dichloroethane solution of the polymer liquid crystal of the formula (26) (non-volatile content: 10 wt. %) was applied by a spinner coater rotating at 3000 rpm and the dried at 100° C to form a polymer liquid crystal layer 5. Separately, another glass substrate 1 provided with an ITO transparent electrode 2 and a uniaxially orientation-treated polyimide alignment layer 4 was prepared in the same manner as above and bonded to the polymer liquid crystal layer 5 on the above substrate so that their orientation-treated directions aligned each other to obtain a device as shown in FIG. 5. Then the device was heated to a temperature of about 150° C which was sufficiently higher than the clear point of the polymer liquid crystal and then gradually cooled to form a uniaxially aligned recording layer 5. Then the recording layer 5 was heated above the glass transition point and a voltage of 10 V was applied thereto to uniformize the polarization. The recording layer 5 was further irradiated with a laser beam for heating while being supplied with a reverse voltage of −10 V to effect writing.

The recording medium was placed between a pair of a polarizer 16 and an analyzer 17 which were disposed to prevent transmittance of readout light 18 at a non-recorded portion, and transmitted light was detected by a photodiode to read out the recorded portion.

In this way, the record was read out at a contrast ratio of 0.8, which was not lowered even after repetitive reading.

EXAMPLE 5

Figure 6:
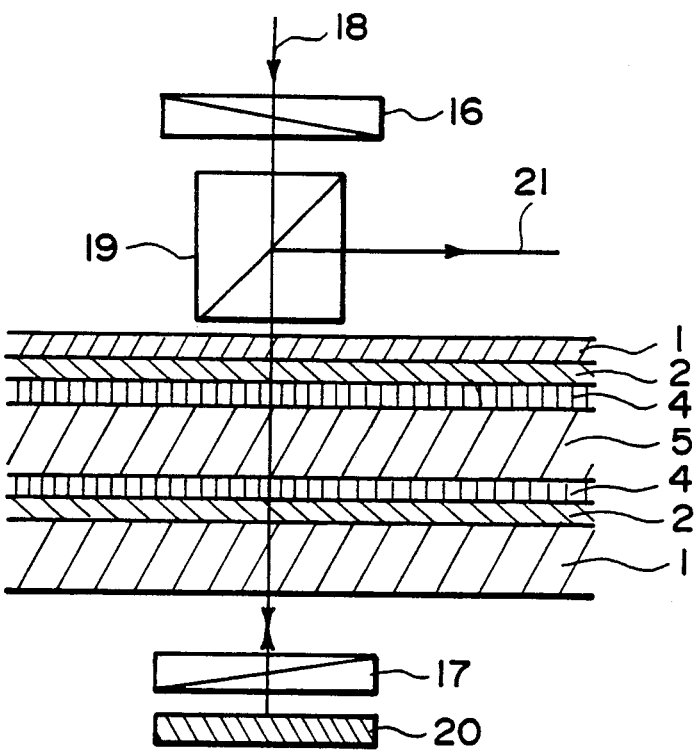

The recording medium obtained in Example 4 was placed in a system as shown in FIG. 6 which included a polarizer 16, a beam splitter 19, an analyzer 17 and a reflecting plate 20, whereby the record was read out at a contrast ratio of 0.7.

EXAMPLE 6

Figure 7:
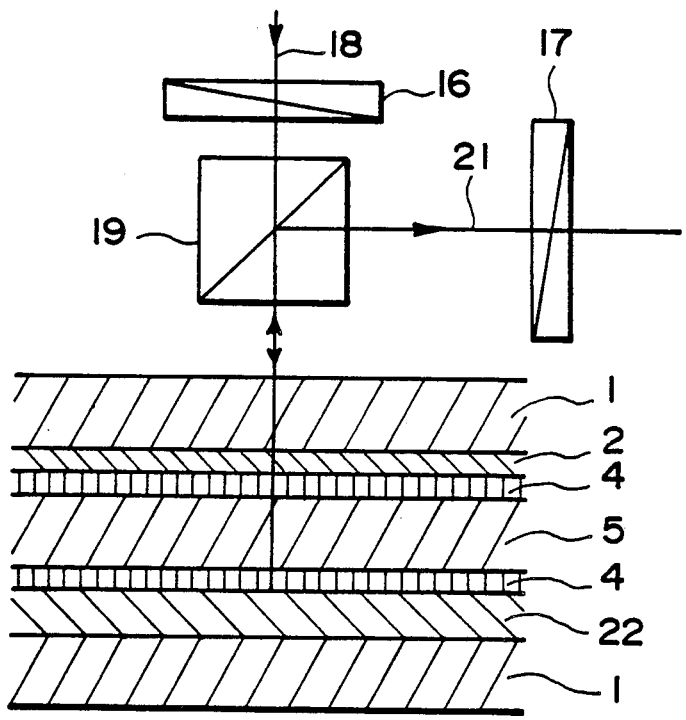

Referring to FIG. 7, a glass substrate 1 provided with an ITO electrode 2 was coated with a polyamic acid solution ("PIQ" available from Hitachi Kasei Kogyo K.K.; non-volatile content: 3 wt. %) by a spinner coater and the coating was heated for 30 minutes at 120° C, for 60 minutes at 200° C and for 30 minutes at 350° C to form a polyimide alignment layer 4 which was then provided with a uniaxial orientation characteristic by rubbing. On the layer 4, a solution of the polymer liquid crystal was applied by a spinner coater in the same manner as in Example 4 and dried at 100° C. Separately, another glass substrate 1 provided with a 5000 Å-thick vapor-deposited aluminum layer 22 and a polyimide alignment layer 4 was prepared and bonded to the polymer liquid crystal layer 5 on the other substrate so that their alignment axes aligned each other to provide a recording medium as shown in FIG. 7.

The recording medium was subjected to writing of a record in the same manner as in Example 4 and placed in a reading system as shown in FIG. 7 including a polarizer 16, an analyzer 17 and a beam splitter 19. The readout light 21 having passed through the analyzer was detected by a photodiode, whereby the record was read out at a contrast ratio of 0.6. The contrast ratio was not lowered even after repetitive reading.

EXAMPLE 7

Referring to FIG. 9, a glass substrate 1a provided with stripe pattern electrodes 2a of ITO was coated with a polyamic acid solution ("PIQ" available from Hitachi Kasei Kogyo K.K.; non-volatile content: 5 wt. %) by a spinner coater rotating at 3000 rpm in 30 seconds, and the coating was heated for 30 minutes at 120° C, for 60 minutes at 200° C and for 30 minutes at 350° C to form a polyimide alignment layer 4a which was then provided with a uniaxial orientation characteristic by rubbing. Separately, another glass substrate 1b was provided with ITO stripe electrodes 2b and a polyimide alignment layer 4b in the same manner as above. The two substrates 1a and 1b were disposed so that their stripe electrodes 2a and 2b were perpendicular to each other and their alignment directions were in alignment, and bonded to each other with a 5 μm-thick PET film spacer with an adhesive to form a cell while leaving an injection port unsealed. Then, the cell was evacuated and the open port thereof was dipped in a bath of the melted polymer liquid crystal of the formula (26), followed by restoration to the atmospheric pressure, to seal up the polymer liquid crystal in the cell. Then, the cell was gradually cooled from 100° C to obtain an optical modulation device containing the polymer liquid crystal 5 uniaxially aligned as shown in FIG. 9.

In the optical modulation device, the electrodes 2a and 2b were connected to an external power supply similarly as electrodes 3 and 2 as shown in FIG. 3.

EXAMPLE 8

The optical modulation device prepared in Example 7 was used. The substrates 2a corresponding to scanning electrodes 25 (25a, 25b, . . .) and 2b corresponding to signal electrodes 26 (26a, 26b, . . .) were arranged in a matrix structure as shown in FIG. 10. In operation, a scanning electrode 25a was first supplied with a current to heat the polymer liquid crystal to above the glass transition point and simultaneously the signal electrodes 26 (26a, 26b, . . .) were supplied with selection voltages to effect writing along the scanning electrode 25a. Then, the current to the scanning electrode 25a was stopped and the polymer liquid crystal along the scanning electrode 25a was cooled to below the glass transition point. Then, a scanning electrode 25b was supplied with a current to heat the polymer liquid crystal and the respective signal electrodes 26 were supplied with selection voltages to effect writing. Then the writing was repeated sequentially along the scanning electrodes 25c, 25d, . . . .

At this time, a voltage above a threshold was also applied to a part of the polymer liquid crystal not along the writing scanning electrode, whereas no decrease in contrast or crosstalk occurred.

EXAMPLE 9

Referring to FIG. 11, an optical modulation device was prepared by providing a device similar to one in Example 7 with an absroption layer 30 of 800 nm by vapor deposition and subjected to writing in the following manner.

A light beam issued from a semiconductor laser 27 for heating was deflected by a polygon mirror 28 and a polygon mirror 29 for scanning line selection to scan along a scanning electrode.

When a portion of the liquid crystal heated by the semiconductor laser beam was heated to above the glass transition point, a voltage was applied between a scanning electrode 2 and a non-patterned signal side electrode 31 to write in the heated portion. Thereafter the heated portion was cooled below the glass transition point to fix the written state. The above writing and fixing operations were repeated sequentially on the respective scanning electrodes operating the polygon mirror 29 for scanning line selection. At this time, a voltage above a threshold was also applied to a part of the polymer liquid crystal not heated for writing, whereas no decrease in contrast or crosstalk occurred.

EXAMPLE 10

The device of Example 9 was modified so that a non-patterned electrode was also used on the scanning electrode side. By using this device and laser scanning, heating, writing for selection of a written state and cooling to provide a display. Also in this case, no decrease in contrast or crosstalk occurred.

EXAMPLE 11

A glass substrate 1 provided with an ITO transparent electrode 2 and a semitransparent Au layer 32 of above 400 Å in thickness formed by vapor deposition was coated with a polyamic acid solution (PIQ, available from Hitachi Kasei Kogyo K.K.; nonvolatile content: 3.0 wt. %) by a spinner coater rotating at 3000 rpm, followed by heating for 30 minutes at 120° C, for 60 minutes at 200° C and for 30 minutes at 350° C to form an about 500 Å-thick polyimide layer. Then, a photosensitive polyimide was applied by spin-coating and exposed to light in the form of stripes, followed by removal of excessive portions by etching with an alkali liquid, followed by heating at 200–350° C to form about 2000 Å-thick stripes. Then, the polyimide alignment film with stripes was subjected to a uniaxial aligning treatment by rubbing.

Then, a smooth aluminum substrate 35 was coated with a polyamic acid solution in the same manner as described above, followed by heating, to form a polyimide alignment film which was equally subjected to a uniaxial aligning treatment by rubbing. Then, the coated aluminum substrate 35 was bonded to the aboveprepared glass-ITO substrate 1 so that the alignment directions coincided with each other to form a cell.

The cell was evacuated and then filled with a composition obtained by adding 0.1 wt. % of the abovementioned example dye (E) to a nematic liauid crystal (E7 available from BDH Co.) and hermetically sealed under the atmosphere pressure, thereby to obtain a cell as shown in FIG. 14.

The cell was heated to provide an isotropic phase of the liquid crystal and then gradually cooled to form a uniaxially aligned optical modulation layer 33 in a thickness of about 2000 Å. In this state, the reflectivity of the cell with respect to linear polarized light of 500 nm was measured to be about 5%.

Then, a voltage of 10 V was applied between the ITO electrode and the aluminum substrate, and under this state, the reflecting with respect to light of 500 nm was measured to be 15%.

EXAMPLE 12

A blank cell prepared in the same manner as in Example 11 was filled with a ferroelectric liquid crystal composition prepared by adding 0.1 wt. % of the dye (E) used in Example 11 to a ferroelectric liquid crystal ("CS-1011" available from Chisso K.K.) to prepare a cell. The cell was heated to provide an isotropic phase of the liquid crystal composition and then gradually cooled to provide an aligned phase of the liquid crystal. In this instance, the polarizer 16 was disposed so that its polarizing axis aligned with the optical axis of the ferroelectric liquid crystal under the application of one polarity of voltage of 10 V. The reflectivity with respect to 500 nm at this time was 3%.

Then, a voltage of the other polarity was applied to the cell, and the reflectivity was changed to 10%.

EXAMPLE 13

Referring to FIG. 15A, a glass substrate 1 provided with stripe ITO pattern electrodes 2a was coated with an $SiO_2$ layer 4aa formed by sputter-vapor deposition, then with a semitransparent Au layer 32 of about 400 Å in thickness formed by vapor deposition and then with a polyamic acid solution (non-volatile content: 1.5 wt. %) by a spinner coater, followed by heating to 120°-350° C to form a polyimide alignment film 4a, which was then subjected to a uniaxial aligning treatment by rubbing.

Then, another glass substrate 34 provided with Al stripe electrodes 2b formed by vapor deposition was coated with a polyamic acid solution (nonvolatile content: 1.5 wt. %) by a spinner coater followed by heating to 120°-35 0° C to form a polyimide alignment film 4b.

Then, a photosensitive polyimide was applied thereon and heated to form a spacer 24. The polyimide alignment film 4b was then subjected to a uniaxial aligning treatment.

The two substrates were bonded to each other so that their alignment directions coincided with each other to form a cell.

The cell was filled with the same nematic liquid crystal composition with 0.1 wt. % of the dye (E) and a polarizer was applied to the cell so as to align with the optical axis of the liquid crystal.

Voltages were applied between the transparent electrodes 2a and the Al electrodes 2b of a device as shown in FIG. 15A thus prepared, whereby an S-intersection shown in FIG. 15B supplied with a voltage of 10 V showed a reflectivity of 15% with respect to 500 nm and N-intersections showed a reflectivity of 5%.

EXAMPLE 14

Referring to FIG. 16, a glass substrate 1 provided with an ITO transparent electrode 2 and a semitransparent about 400 Å-thick Au layer 32 formed by vapor deposition was coated with a polyamic acid solution by a spinner coater, followed by succession heating in the range of 120°-350° C to obtain a polyimide alignment film 4, which was then uniaxially aligned by rubbing.

Then, another glass substrate 34 provided with an ITO electrode 2 was coated with a composition obtained by dispersing CdS in a polymer, followed by drying, to form a photoconductive layer 41. The photoconductive layer 41 was then coated with a dielectric mirror 40 by vapor deposition, and a spacer 24 of the photosensitive polyimide was further formed thereon.

The two substrates were bonded to each other to form a cell, in which the same nematic composition with 0.1 wt. % of the dye (E) was filled, and a polarizer was applied to the cell so as to align with the optical axis of the liquid crystal (FIG. 16).

A voltage of 10 V was applied between the upper and lower transparent electrodes 2, and a writing light beam was incident on the photoconductive layer 41 to change the state of the liquid crystal layer, and simultaneously readout light was incident from the polarizer 16 side, whereby the portion of the liquid crystal layer illuminated with the writing beam showed a reflectivity of 10% while the nonilluminated part provided a reflectivity of 5%.

EXAMPLE 15

Referring to FIG. 14, a glass substrate 1 provided with an ITO transparent electrode 2 and a semitransparent Au layer 32 of 500 Å or less formed by vapor deposition was coated with a polyamic acid solution (PIQ, available from Hitachi Kasei Kogyo K.K.; non-volatile content: 3.0 wt. %) by a spinner coater rotating at 3000 rpm, followed by heating for 30 minutes at 120° C, for 60 minutes at 200° C and for 30 minutes at 350° C to form a polyimide alignment film 4, which was then subjected to rubbing to be provided with a uniaxial alignment characteristic.

On the alignment layer 4, a solution (nonvolatile content: 10 wt. %) of a polymer liquid crystal represented by the formula (27) below containing 0.1 wt. % of the above-mentioned dye example (D) added thereto was applied by a spinner coater and dried at 100° C to form an about 2000 Å-thick layer 33.

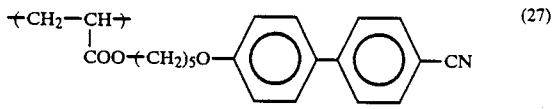

(27)

Separately, an Al substrate 35 provided with a similar alignment control layer 4 was applied to the above layer 33 on the glass substrate 1, and the periphery was sealed to provide a device as shown in FIG. 14. The device was heated to 150° C and then gradually cooled to cause a uniazial alignment.

The device was uniformly irradiated with a beam from a 5 mW semiconductor laser, and a voltage was applied between the ITO electrode 2 and the Al substrate 35, whereby the liquid crystal layer 33 was uniformly heated above the glass transition point and the spontaneous polarization was thus uniformly oriented the optical modulation layer having the written portion thus formed and the non-written portion cooled below the glass transition point was illuminated with a polarized 0.2 mW semiconductor laser beam having a plain of polarization in alignment with the optical access of the polymer liquid crystal molecules in the non-written portion, whereby a good display state with reflectivities of 5% at the written portion and 15% at the non-written portion was obtained. The reflectivities were not changed even after storage of the device at room temperature for 20 days.

EXAMPLE 16

Referring again to FIG. 14, a glass substrate 1 provided with an ITO transparent electrode 2 and a semitransparent Au layer 32 of 500 Å or less formed by vapor deposition was coated with a polyamic acid solution (PIQ, available from Hitachi Kasei Kogyo K.K.; non-volatile content: 5.0 wt. %) by a spinner coater rotating at 3000 rpm, followed by heating for 30 minutes at 120° C, for 60 minutes at 200° C and for 30 minutes at 350° C to form a polyimide alignment film 4, which was then subjected to rubbing to be provided with a uniaxial alignment characteristic.

On the alignment layer 4, a solution (nonvolatile content: 5 wt. %) of a ferroelectric polymer liquid crystal represented by the formula (28) below containing 0.1 wt. % of the above-mentioned dye example (D) added thereto was applied by a spinner coater rotating at 3000 rpm and dried at 100° C to form an about 2000 Å-thick layer 33.

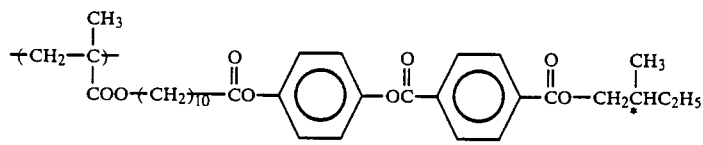
(28)

Separately, an Al substrate 35 provided with a similar alignment control layer 4 was applied to the above layer 33 on the glass substrate 1 and the periphery was sealed to provide a device as shown in FIG. 14.

The device was gradually cooled from a temperature sufficiently higher than the clear point of the ferroelectric polymer liquid crystal to effect uniform alignment and further supplied with a DC voltage of 30 V applied between the ITO electrode 2 and the Al substrate 35 at a temperature above Tg.

After the device was cooled to room temperature, the device was selectively irradiated with a 5 mW semiconductor laser beam while being supplied with a DC voltage of the other polarity, followed by termination of the laser irradiation and the voltage application, to effect writing.

Then, the device was illuminated with a polarized 0.2 mW semiconductor laser beam having a plane of polarization in alignment with the optical axis of the ferroelectric polymer at the non-writing part to measure the reflectivity, whereby the reflectivity was 10% at the written part and 25% at the unwritten part. The reflectivities were not changed even after more than 100 times of repetitive reading.

EXAMPLE 17

Figure 17A:
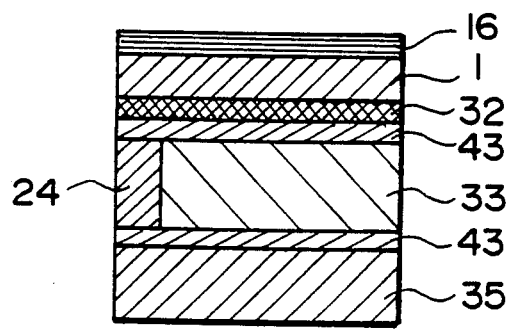
FIGS. 17A-17C are explanatory views for illustrating operations in Example 17.

Referring to FIG. 17A, a glass substrate provided with a semitransparent Al film of 500 Å or less formed by vapor deposition was coated with an MEK solution (solid content: 5 wt. %) of vinylidene fluoride-trifluoroethylene copolymer (75:25) by a spinner coater rotating at 3000 rpm in 30 sec. followed by drying at 150° C. for 1 hour to form an alignment film 43.

On the alignment layer 43, a dichloroethane solution (non-volatile content: 5 wt. %) of a polymer liquid crystal represented by the formula (29) below containing 0.1 wt. % of the above-mentioned dye example (D) was applied by a spinner coater and dried at 100° C to provide a polymer liquid crystal layer 33.

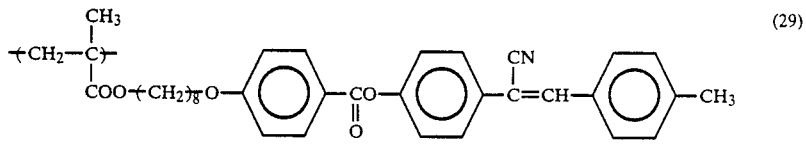
(29)

Then, an Al substrate 35 provided with an alignment layer 43 of vinylidene fluoride-trifluoroethylene copolymer (75:25) in the same manner as above, was applied to the above layer 33 on the glass substrate 1, and the periphery was sealed by a sealant 24 to provide a device as shown in FIG. 17A.

Figure 17B:
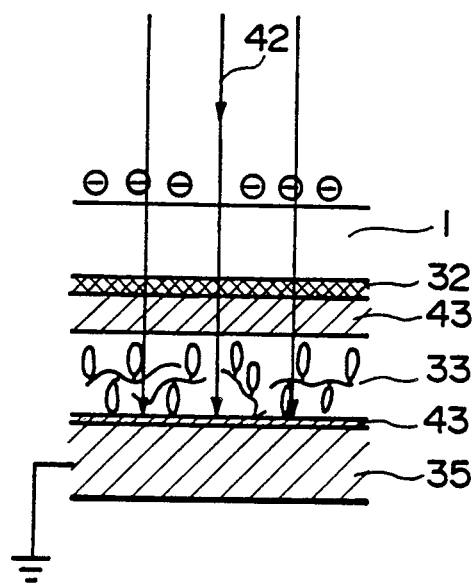
Figure 17C:
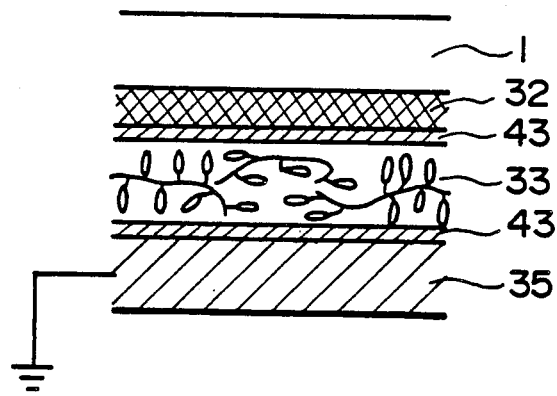

The device was heated to above the clear point of the polymer liquid crystal and gradually cooled to provide a homeotropically aligned polymer liquid crystal layer 33. The device was provided with corona charge on the glass substrate by a corona discharger and the Al substrate 35 was grounded to apply a voltage to the polymer liquid crystal layer 33 while selectively heating the layer 33 by irradiating a 5 mW semiconductor laser beam 42 as shown in FIG. 17B. Then, the laser irradiation was stopped and the corona charge was removed by a decharger to effect writing (FIG. 17C). The recording layer 33 having a recorded portion and a non-recorded portion was read out by illumination with a linear polarized 0.2 mW semiconductor laser beam, whereby the recorded portion showed a reflectivity of 10% and the non-recorded portion showed a reflectivity of 3%. Then, the recorded portion of the recording layer 33 was irradiated with a 5 mW semiconductor laser beam 42 without imparting a corona charge and then cooled, whereby the reflectivity of the thus treated recorded portion was restored to 3%.

EXAMPLE 18

One side of a glass substrate provided with a polarizer on the other side, was coated with an ITO transparent electrode and a 50 Å-thick Al film formed by vapor deposition and was further coated with a polyamic acid solution ("PIQ" available from Hitachi Kasei Kogyo K.K.) by a spinner coater rotating at 3000 rpm in 30 sec., followed by heating for 30 min. at 120° C, for 60 min. at 200° C and for 30 min. at 350° C to form a polyimide alignment film, which was then provided with a uniaxial orientation characteristic by rubbing.

On the alignment film, a dichloroethane solution (non-volatile content: 10 wt. %) of a polymer liquid crystal represented by the before-mentioned formula (20) containing 0.1 wt. % based on the polymer liquid crystal of the above-mentioned dye (D), was applied by a spinner coater rotating at 3000 rpm and dried at 100° C to form an about 3000 Å-thick optical modulation layer.

On the optical modulation layer on the glass substrate, an Al substrate was applied, and the periphery was sealed to obtain a device. The device was heated to 150° C and cooled under application of an electric field to uniaxially align the polymer liquid crystal. The device was irradiated with a 5 mW semiconductor laser beam of 830 nm, and a voltage was applied between the ITO electrode and the Al substrate to effect recording. The reflectivity of the device was measured by illuminating with a linear polarized 0.2 mW semiconductor laser beam to be 40% at the recorded portion and 5% at the non-recorded portion, thus showing a good recording state. Even after 20 days of standing at room temperature, the reflectivities the device were not changed at all.

After rotating the polarizing axis of the polarizer by 90° from that used in recording, the reflectivity of the device was measured with respect to the same wavelength, whereby the recorded portion showed a reflectivity of 5% and the non-recorded portion showed 40%. Further, when the recorded portion was irradiated with a laser beam while being supplied with an electric field of the opposite direction, whereby the recorded portion could be erased.

EXAMPLE 19

A glass substrate was treated in the same manner as in Example 18 up to the provision of the alignment film.

Then, on the alignment film, an identical solution of the polymer liquid crystal (20) and the dye (D) at the same concentrations as used in Example 18 was applied by a spinner coater rotating at 1200 rpm, followed by drying at 100° C, to form an optical modulation layer having a thickness of about 4500 Å at this time. On the optical modulation layer, a 2000 Å-thick Al layer was vapor-deposited to form a device. The device was heated to 150° C and gradually cooled under application of an electric field to effect uniaxial alignment.

A yet unrecorded portion of the optical modulation layer showed a reflectivity of 10% with respect to a polarized semiconductor laser beam with a wavelength of 830 nm and showed a reflectivity of 70% with respect a polarized beam with a wavelength of 633 nm having a plane of polarization perpendicular to that of the beam of 830 nm.

Then, a yet unrecorded portion of the optical modulation layer was irradiated with a 0.5 mW laser beam of 830 nm while applying a voltage between the ITO and Al electrodes, whereby the reflectivity with respect to the beam of 830 nm was changed to effect recording and the recorded portion showed a varied reflectivity of 10% with respect to the beam of 633 nm. Then, the recorded portion was irradiated with the beam of 633 nm while being supplied with a voltage of the opposite direction, whereby the reflectivity of the recorded portion was restored to the original value to effect erasure.

EXAMPLE 20

A glass substrate provided with an ITO transparent electrode and a 50 Å-thick Au layer by vapor deposition was further coated with a polyimide alignment film which was then rubbed to be provided with a uniaxial alignment characteristic. On the alignment film, a dichloroethane solution (non-volatile content: 5 wt. %) of a ferroelectric polymer liquid crystal represented by the before-mentioned formula (25) containing 0.1 wt. % based on the ferroelectric polymer liquid crystal of the above-mentioned dye (D), was applied by a spinner coater rotating at 2000 rpm and dried at 100° C.

On the optical modulation layer on the glass substrate, an Al substrate provided with a polyimide alignment film formed in the same manner as above was applied, and the periphery was sealed to obtain a device. The device was gradually cooled from a temperature sufficiently above the clear point, and at a temperature above the Tg, a DC voltage of 20 V was applied between the ITO electrode and the Al substrate.

After being cooled to room temperature, the device was illuminated with a linear polarized beam while rotating the plane of polarization so as to provide a minimum reflectivity, whereby the minimum reflectivity was measured to be 15%. While selectively irradiating the device with the linear polarized light, a voltage opposite to the above DC voltage was applied to effect writing. The written portion changed its reflectivity from 15% to 40%.

Further, in the same manner as in Example 18, the device was irradiated with an erasure laser beam having a plane of polarization perpendicular to that of the laser beam used for writing, and simultaneously an electric field opposite to that used in writing was applied, whereby the recorded portion was erased.

EXAMPLE 21

The same optical modulation device as used in Example 19 having an about 4500 Å-thick optical modulation layer was irradiated with a semiconductor laser beam of 830 nm (writing beam) while a voltage was applied between the ITO and Al electrodes, thereby to effect writing. When the plane of polarization was rotated by 30° in the clockwise direction, the reflectivity of the recorded portion changed from 50% to 13%. Accordingly, the device was irradiated with a light beam (erasure beam) with a plane of orientation deviated by 30° from that of the writing beam and with the same wavelength while being supplied with a voltage reverse to that applied at the time of writing between the ITO and Al electrodes, whereby the erasure of the recorded portion was effected.

What is claimed is:

1. An optical modulation method, comprising:
writing in a ferroelectric having a spontaneous polarization and a glass transition point by applying an electric field to the ferroelectric heated at or above the glass transition point to orient the spontaneous polarization of the ferroelectric to a prescribed direction, and
holding the prescribed direction of the spontaneous polarization below the glass transition point.

2. A method according to claim 1, wherein the written state is given by a change in birefringence of the ferroelectric.

3. A method according to claim 1, wherein said ferroelectric is heated at or above the glass transition point by a heat-generating electrode.

4. A method according to claim 1, wherein the ferroelectric is disposed between a pair of electrodes, and the ferroelectric is heated at or above the glass transition point by irradiation with a semiconductor laser beam through one of the pair of electrodes.

5. A method according to claim 1, wherein said ferroelectric is a ferroelectric polymer.

6. A method according to claim 5, wherein said ferroelectric polymer is a ferroelectric polymer liquid crystal.

7. An optical modulation method, comprising
writing in a ferroelectric having a spontaneous polarization and a glass transition point by applying an electric field to the ferroelectric heated at or above the glass transition point to orient the spontaneous polarization of the ferroelectric to a prescribed direction,
holding the prescribed direction of the spontaneous polarization below the glass transition point, and
optically discriminating the prescribed direction of the spontaneous polarization as a difference in birefringence of the ferroelectric.

8. A method according to claim 7, wherein the written state is discriminated by means of a beam splitter.

9. An optical modulation apparatus, comprising:
an optical modulation device comprising a pair of electrodes and a ferroelectric having a spontaneous polarization and a glass transition point, said ferroelectric being disposed between the electrodes; and
means for writing in the ferroelectric by heating the ferroelectric at or above the glass transition point under application of an electric field to orient the spontaneous polarization to a prescribed direction and holding the prescribed direction of the spontaneous polarization below the glass transition point.

10. An apparatus according to claim 9, further comprising an alignment control layer in contact with the ferroelectric, said ferroelectric being in the form of a layer.

11. An apparatus according to claim 9, wherein said ferroelectric is a ferroelectric polymer.

12. An apparatus according to claim 9, wherein said ferroelectric polymer is a ferroelectric polymer liquid crystal.

13. An apparatus according to claim 9, wherein said writing means includes a heat-generating electrode for heating the ferroelectric at or above the glass transition point.

14. An apparatus according to claim 9, wherein said writing means includes a semiconductor laser beam for irradiating the ferroelectric through one of the pair of electrodes to heat the ferroelectric at or above the glass transition point.

15. An optical modulation apparatus, comprising:
an optical modulation device comprising a pair of electrodes and a ferroelectric having a spontaneous polarization and a glass transition point, said ferroelectric being disposed between the electrodes;
means for writing in the ferroelectric by heating the ferroelectric at or above the glass transition point under application of an electric field to orient the spontaneous polarization to a prescribed direction and holding the prescribed direction of the spontaneous polarization below the glass transition point; and
means for optically discriminating the prescribed direction of the spontaneous polarization as a difference in the birefringence of the ferroelectric held below the glass transition point.

16. An apparatus according to claim 15, further comprising an alignment control layer in contact with the ferroelectric, said ferroelectric being in the form of a layer.

17. An apparatus according to claim 15, wherein said ferroelectric is a ferroelectric polymer.

18. An apparatus according to claim 17, wherein said ferroelectric polymer is a polymer liquid crystal having a chiral smectic phase.

19. An apparatus according to claim 15, wherein said optical discrimination means includes a beam splitter.

20. An optical modulation apparatus, comprising:
an optical modulation device including an optical modulation layer comprising an optical modulation compound having a birefringence, the optical modulation layer being set to an optical thickness capable of providing a multiple reflection state;
optical modulation means for changing the optical thickness of the optical modulation layer to change the multiple reflection state of the layer; and
means for illuminating the optical modulation layer with readout light to optically discriminate the multiple reflection state as a difference in quantity of reflected light.

21. An apparatus according to claim 20, wherein said optical modulation compound is capable of changing its birefringence in response to an electric field applied thereto and said optical modulation means comprises voltage application means.

22. An apparatus according to claim 20, wherein said optical modulation compound comprises a nematic liquid crystal.

23. An apparatus according to claim 20, wherein said optical modulation compound comprises a chiral smectic liquid crystal.

24. An apparatus according to claim 23, wherein said chiral smectic liquid crystal comprises a liquid crystal showing chiral smectic C phase, chiral smectic F phase, chiral smectic I phase, chiral smectic H phase, chiral smectic J phase, chiral smectic G phase or chiral smectic K phase.

25. An apparatus according to claim 20, wherein said optical modulation layer causes a change in optical thickness of 0.2 $\mu$m or less.

26. An optical modulation apparatus according to claim 20, further comprising an alignment control layer in contact with the optical modulation layer.

27. An optical modulation method, comprising:
providing an optical modulation device including an optical modulation layer comprising an optical modulation compound having a birefringence and capable of changing the birefringence in response to an electric field applied thereto, the optical modulation layer being set to an optical thickness capable of providing a multiple reflection state;
changing the optical thickness of the optical modulation layer to change the multiple reflection state of the layer; and
illuminating the optical modulation layer with readout light to optically discriminate the multiple reflection state as a difference in quantity of reflected light.

28. A method according to claim 27, wherein said optical modulation compound is capable of changing its birefringence in response to an electric field applied thereto and the optical thickness of the optical modulation layer is changed by applying a voltage across the optical modulation layer.

29. An optical modulation apparatus, comprising:
an optical modulation device including an optical modulation layer comprising an optical modulation compound having a glass transition point and a refractive index anisotropy, the optical modulation layer being set to an optical thickness capable of providing a multiple reflection state;
recording means for writing in the optical modulation layer at or above the glass transition point of the optical modulation compound and holding the resultant written state below the glass transition point, said recording means including optical modulation means for changing the optical thickness of the optical modulation layer to change the multiple reflection state of the optical modulation layer; and
means for illuminating the optical modulation layer with readout light to optically discriminate the multiple reflection state as a difference in quantity of reflected light.

30. An apparatus according to claim 29, wherein said optical modulation compound is capable of changing its refractive index anisotropy in response to an electric field applied thereto, and said optical modulation means comprises voltage application means.

31. An apparatus according to claim 29, wherein said optical modulation compound comprises a polymer liquid crystal.

32. An apparatus according to claim 29, wherein said optical modulation compound comprises a ferroelectric polymer liquid crystal.

33. An apparatus according to claim 29, wherein said optical modulation layer causes a change in optical thickness of 0.2 μm or less.

34. An optical modulation apparatus according to claim 29, further comprising an alignment control layer in contact with the optical modulation layer.

35. An optical modulation method, comprising:
providing an optical modulation device including an optical modulation layer comprising an optical modulation compound having a glass transition point and a refractive index anisotropy, the optical modulation layer being set to an optical thickness capable of providing a multiple reflection state;
a recording step for writing in the optical modulation layer at or above the glass transition point of the optical modulation compound and holding the resultant written state below the glass transition point, said recording step including a step for changing the optical thickness of the optical modulation layer to change the multiple reflection state of the optical modulation layer; and
illuminating the optical modulation layer with readout light to optically discriminate the multiple reflection state as a difference in quantity of reflected light.

36. A method according to claim 35, wherein said optical modulation compound is capable of changing its birefringence in response to an electric field applied thereto and the optical thickness of the optical modulation layer is changed by applying a voltage across the optical modulation layer.

37. An optical modulation apparatus, comprising:
an optical modulation device including an optical modulation layer comprising an optical modulation compound which has a glass transition point and a refractive index anisotropy and is capable of changing its refractive index anisotropy in response to an electric field applied thereto, the optical modulation layer being set to an optical thickness capable of providing a multiple reflection state;
means for irradiating the optical modulation layer with writing light and applying an electric field of one polarity across the optical modulation layer to change the multiple reflection state of the optical modulation layer, thus writing in the optical modulation layer; and
means for irradiating the optical modulation layer with erasure light having a plane of polarization different from that of the writing light and applying an electric field of the opposite polarity across the optical modulation layer to again change the multiple reflection state of the optical modulation layer, thus erasing the optical modulation layer.

38. An apparatus according to claim 37, wherein said optical modulation compound comprises a polymer liquid crystal.

39. An apparatus according to claim 27, wherein said optical modulation compound comprises a ferroelectric polymer liquid crystal.

40. An optical modulation apparatus according to claim 37, further comprising an alignment control layer in contact with the optical modulation layer.

41. An optical modulation apparatus, comprising:
an optical modulation device including an optical modulation layer comprising an optical modulation compound which has a glass transition point and a refractive index anisotropy and is capable of changing its refractive index anisotropy in response to an electric field applied thereto, the optical modulation layer being set to an optical thickness capable of providing a multiple reflection state;
means for irradiating the optical modulation layer with writing light and applying an electric field of one polarity across the optical modulation layer to change the multiple-reflection state of the optical modulation layer, thus writing in the optical modulation layer; and
means for irradiating the optical modulation layer with erasure light having a wavelength different from that of the writing light and applying an electric field of the opposite polarity across the optical modulation layer to again change the multiple reflection state of the optical modulation layer, thus erasing the optical modulation layer.

42. An apparatus according to claim 41, wherein said optical modulation compound comprises a polymer liquid crystal.

43. An apparatus according to claim 41, wherein said optical modulation compound comprises a ferroelectric polymer liquid crystal.

44. An optical modulation apparatus according to claim 41, further comprising an alignment control layer in contact with the optical modulation layer.

45. An optical modulation apparatus, comprising:
an optical modulation device including an optical modulation layer comprising an optical modulation compound which has a glass transition point and a refractive index anisotropy and is capable of changing its refractive index anisotropy in response to an electric field applied thereto, the optical modulation layer being set to an optical thickness capable of providing a multiple reflection state;

means for irradiating the optical modulation layer with writing light and applying an electric field of one polarity across the optical modulation layer to change the multiple reflection state of the optical modulation layer, thus writing in the optical modulation layer; and means for irradiating the optical modulation layer with erasure light having a wavelength and a plane of polarization different from those of the writing light and applying an electric field of the opposite polarity across the optical modulation layer to again change the multiple reflection state of the optical modulation layer, thus erasing the optical modulation layer.

46. An apparatus according to claim 45, wherein said optical modulation compound comprises a polymer liquid crystal.

47. An apparatus according to claim 45, wherein said optical modulation compound comprises a ferroelectric polymer liquid crystal.

48. An optical modulation apparatus according to claim 45, further comprising an alignment control layer in contact with the optical modulation layer.

* * * * *